(12) United States Patent
Doi

(10) Patent No.: US 12,451,797 B2
(45) Date of Patent: Oct. 21, 2025

(54) COMMAND DEVICE, DRIVE DEVICE, CONTROL DEVICE AND POWER CONVERSION SYSTEM

(71) Applicant: Mitsubishi Electric Corporation, Tokyo (JP)

(72) Inventor: Kentaro Doi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 160 days.

(21) Appl. No.: 18/555,609

(22) PCT Filed: Jun. 2, 2021

(86) PCT No.: PCT/JP2021/020999
§ 371 (c)(1),
(2) Date: Oct. 16, 2023

(87) PCT Pub. No.: WO2022/254608
PCT Pub. Date: Dec. 8, 2022

(65) Prior Publication Data
US 2024/0204647 A1 Jun. 20, 2024

(51) Int. Cl.
*H02M 7/538* (2007.01)
*H02M 1/00* (2007.01)
(Continued)

(52) U.S. Cl.
CPC ......... *H02M 1/082* (2013.01); *H02M 1/0003* (2021.05); *H02M 1/084* (2013.01); *H02M 7/5395* (2013.01); *H02M 7/5387* (2013.01)

(58) Field of Classification Search
CPC .... H02M 1/0003; H02M 1/0012; H02M 1/08; H02M 1/082; H02M 1/084;
(Continued)

(56) References Cited

U.S. PATENT DOCUMENTS 5,760,707 A * 6/1998 Katagiri ............. H02P 6/34
340/870.14
7,251,280 B2 * 7/2007 Chiang ............. G06F 3/0676
375/257
(Continued)

FOREIGN PATENT DOCUMENTS

JP H0898506 A * 4/1996
JP H11178349 A 7/1999
(Continued)

OTHER PUBLICATIONS

International Search Report (PCT/ISA/210) with English translation and Written Opinion (PCT/ISA/237) mailed on Aug. 10, 2021, by the Japanese Patent Office as the International Searching Authority for International Application No. PCT/JP2021/020999.

*Primary Examiner* — Thienvu V Tran
*Assistant Examiner* — Shahzeb K Ahmad
(74) *Attorney, Agent, or Firm* — BUCHANAN, INGERSOLL & ROONEY PC

(57) ABSTRACT

A command device is connected with a serial line to a driving device for controlling operations of a plurality of first switching elements and one or more second switching elements. The command device includes a command signal generator to generate a plurality of first command signals and one or more second command signals, an encoder to generate encoded data by encoding at least some signals of the plurality of first command signals and the one or more second command signals, and a command-device serializer to generate serial command data through serial conversion of the encoded data and transmit the serial command data to the driving device via the serial line.

18 Claims, 24 Drawing Sheets

(51) Int. Cl.
*H02M 1/08* (2006.01)
*H02M 1/084* (2006.01)
*H02M 7/5395* (2006.01)
*H02M 7/5387* (2007.01)

(58) Field of Classification Search
CPC ........ H02M 1/0845; H02M 1/36; H02M 5/40;
H02M 5/45; H02M 7/48; H02M 7/4803;
H02M 7/487; H02M 7/49; H02M 7/53;
H02M 7/538; H02M 7/53803; H02M
7/53846; H02M 7/5362; H02M 7/5387;
H02M 7/53873; H02M 7/539; H02M
7/5395; H02M 7/66
See application file for complete search history.

(56) References Cited

U.S. PATENT DOCUMENTS

| | | | |
|---|---|---|---|
| 2013/0039108 A1 | 2/2013 | Watanabe et al. | |
| 2013/0082516 A1* | 4/2013 | Yamaguchi | H04B 3/548 |
| | | | 307/1 |
| 2015/0023080 A1* | 1/2015 | Chambon | H02M 7/4837 |
| | | | 327/108 |
| 2016/0233800 A1* | 8/2016 | Fukuta | H02P 6/16 |
| 2024/0195321 A1* | 6/2024 | Kawai | H02P 27/08 |

FOREIGN PATENT DOCUMENTS

| | | | | |
|---|---|---|---|---|
| JP | 2012060793 A | 3/2012 | | |
| JP | 2013038895 A | 2/2013 | | |
| JP | 2019033556 A | 2/2019 | | |
| WO | WO-2020203548 A1 * | 10/2020 | | H03M 7/14 |

* cited by examiner

FIG.5

| FIRST COMMAND SIGNAL | | | | | | CODE | | | | |
|---|---|---|---|---|---|---|---|---|---|---|
| Su | Sx | Sv | Sy | Sw | Sz | C4 | C3 | C2 | C1 | C0 |
| 0 | 0 | 0 | 0 | 0 | 0 | 0 | 0 | 0 | 1 | 0 |
| 0 | 0 | 0 | 0 | 0 | 1 | 0 | 0 | 0 | 1 | 1 |
| 0 | 0 | 0 | 0 | 1 | 0 | 0 | 0 | 1 | 0 | 0 |
| 1 | 0 | 0 | 0 | 0 | 0 | 1 | 0 | 1 | 0 | 0 |
| 1 | 0 | 0 | 0 | 0 | 1 | 1 | 0 | 1 | 0 | 1 |
| 1 | 0 | 1 | 0 | 0 | 1 | 1 | 1 | 0 | 1 | 1 |
| 1 | 0 | 1 | 0 | 1 | 0 | 1 | 1 | 1 | 0 | 0 |

FIG.6

| FIRST COMMAND SIGNAL | | | | | | SECOND COMMAND SIGNAL | | ENCODED DATA | | | | | | |
|---|---|---|---|---|---|---|---|---|---|---|---|---|---|---|
| Su | Sx | Sv | Sy | Sw | Sz | S1 | S2 | C6 | C5 | C4 | C3 | C2 | C1 | C0 |
| 0 | 0 | 0 | 0 | 0 | 0 | 0 | 0 | 0 | 0 | 0 | 0 | 0 | 1 | 0 |
| 0 | 0 | 0 | 0 | 0 | 1 | 0 | 0 | 0 | 0 | 0 | 0 | 0 | 1 | 1 |
| 0 | 0 | 0 | 0 | 1 | 0 | 0 | 0 | 0 | 0 | 0 | 0 | 1 | 0 | 0 |
| 1 | 0 | 0 | 0 | 1 | 0 | 0 | 0 | 0 | 0 | 1 | 1 | 1 | 0 | 0 |
| 0 | 0 | 1 | 0 | 0 | 0 | 1 | 0 | 1 | 0 | 0 | 0 | 0 | 1 | 0 |
| 1 | 0 | 1 | 0 | 0 | 0 | 1 | 1 | 1 | 1 | 1 | 0 | 1 | 1 | 1 |
| 1 | 0 | 1 | 0 | 0 | 0 | 1 | 1 | 1 | 1 | 1 | 1 | 0 | 0 | 0 |
| 1 | 0 | 1 | 0 | 1 | 0 | 1 | 1 | 1 | 1 | 1 | 1 | 1 | 1 | 1 |
| 1 | 0 | 1 | 0 | 1 | 0 | 1 | 1 | 1 | 1 | 1 | 1 | 1 | 0 | 0 |

FIG.7

| SYNCHRONIZATION DATA | C0 | C1 | C2 | C3 | C4 | C5 | C6 | P1 |
|---|---|---|---|---|---|---|---|---|

FIG.13

| FIRST COMMAND SIGNAL | | | | | | SECOND COMMAND SIGNAL | | DATA OUTPUT FROM SELECTOR | | | | | | |
|---|---|---|---|---|---|---|---|---|---|---|---|---|---|---|
| Gu | Gx | Gv | Gy | Gw | Gz | G1 | G2 | D6 | D5 | D4 | D3 | D2 | D1 | D0 |
| 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 1 | 0 | 0 | 0 | 0 | 0 | 0 |
| 0 | 0 | 0 | 0 | 1 | 0 | 0 | 0 | 0 | 0 | 0 | 0 | 0 | 1 | 0 |
| | | | | | | | | 1 | 0 | 0 | 0 | 0 | 1 | 0 |
| | | | | | | | | 0 | 1 | 0 | 0 | 0 | 0 | 0 |

FIG.14

| SYNCHRONIZATION DATA | D0 | D1 | D2 | D3 | D4 | D5 | D6 | P2 |
|---|---|---|---|---|---|---|---|---|

FIG.18

| FIRST COMMAND SIGNAL ||||||||| CODE ||||||
|---|---|---|---|---|---|---|---|---|---|---|---|---|---|
| Su1 | Su2 | Sx1 | Sx2 | Sv1 | Sv2 | Sy1 | Sy2 | C5 | C4 | C3 | C2 | C1 | C0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 1 | 1 |
| 0 | 0 | 0 | 0 | 0 | 0 | 1 | 1 | 0 | 0 | 0 | 1 | 0 | 1 |
| 1 | 0 | 0 | 0 | 0 | 0 | 0 | 0 | 0 | 1 | 0 | 0 | 1 | 0 |
| 1 | 0 | 0 | 0 | 0 | 0 | 0 | 1 | 0 | 1 | 0 | 0 | 1 | 1 |
| 1 | 1 | 0 | 0 | 0 | 1 | 0 | 0 | 1 | 1 | 1 | 1 | 1 | 1 |
| 1 | 1 | 0 | 0 | 1 | 0 | 0 | 0 | 1 | 1 | 1 | 0 | 1 | 0 |
| 1 | 1 | 0 | 0 | 1 | 1 | 0 | 0 | 0 | 0 | 0 | 0 | 0 | 1 |

FIG.19

| FIRST COMMAND SIGNAL | | | | | | | | SECOND COMMAND SIGNAL | ENCODED DATA | | | | | | |
|---|---|---|---|---|---|---|---|---|---|---|---|---|---|---|---|
| Su1 | Su2 | Sx1 | Sx2 | Sv1 | Sv2 | Sy1 | Sy2 | S3 | C6 | C5 | C4 | C3 | C2 | C1 | C0 |
| 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 1 | 0 | 0 | 0 | 0 | 0 | 0 | 1 | 1 |
| 0 | 0 | 0 | 0 | 0 | 0 | 1 | 1 | 0 | 0 | 0 | 0 | 0 | 1 | 0 | 0 |
| ... | ... | ... | ... | ... | ... | ... | ... | ... | ... | ... | ... | ... | ... | ... | ... |
| 1 | 1 | 0 | 0 | 1 | 1 | 0 | 0 | 0 | 0 | 0 | 0 | 0 | 0 | 0 | 1 |
| 0 | 0 | 0 | 1 | 0 | 0 | 0 | 0 | 1 | 1 | 0 | 0 | 1 | 0 | 1 | 0 |
| ... | ... | ... | ... | ... | ... | ... | ... | ... | ... | ... | ... | ... | ... | ... | ... |
| 1 | 1 | 0 | 0 | 1 | 0 | 0 | 0 | 1 | 1 | 0 | 0 | 0 | 0 | 0 | 0 |
| 1 | 1 | 0 | 0 | 1 | 1 | 0 | 0 | 1 | 1 | 0 | 0 | 0 | 0 | 0 | 1 |

FIG.21

| FIRST COMMAND SIGNAL | | | | | | | | SECOND COMMAND SIGNAL | DATA OUTPUT FROM SELECTOR | | | | | | |
|---|---|---|---|---|---|---|---|---|---|---|---|---|---|---|---|
| Gu1 | Gu2 | Gx1 | Gx2 | Gv1 | Gv2 | Gy1 | Gy2 | G3 | D6 | D5 | D4 | D3 | D2 | D1 | D0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 1 | 0 | 1 | 0 | 0 | 0 | 1 |
| 0 | 0 | 0 | 0 | 0 | 0 | 1 | 1 | 1 | 0 | 0 | 0 | 0 | 0 | 0 | 1 |
| 0 | 0 | 0 | 0 | 0 | 0 | 1 | 1 | 1 | 1 | 0 | 0 | 0 | 0 | 0 | 1 |

COMMAND DEVICE, DRIVE DEVICE, CONTROL DEVICE AND POWER CONVERSION SYSTEM

TECHNICAL FIELD

The present disclosure relates to a command device, a driving device, a control apparatus, and a power conversion system.

BACKGROUND ART

A typical power conversion apparatus includes a power conversion circuit, such as inverter or converter, including multiple switching elements. The switching elements in the power conversion circuit are controlled by a control apparatus, so that the power conversion apparatus converts input electric power into electric power to be fed to a load and feeds the electric power resulting from conversion to the load. The control apparatus includes a command device to generate multiple command signals for instructing operations of the switching elements, and a driving device to generate control signals for controlling the switching elements in accordance with the command signals and transmit the control signals to the respective switching elements.

In the case where a high voltage is applied to the power conversion circuit, the driving device is made of circuit elements with high withstand voltage and disposed at a position adjacent to the power conversion circuit. In contrast, the command device is insulated from the power conversion circuit and disposed at a position away from the power conversion apparatus. One example of the control apparatus including the command device and the driving device connected to each other via a serial line is disclosed in Patent Literature 1.

For example, the command device disclosed in Patent Literature 1 generates serial data from multiple command signals, and generates a data frame containing the serial data. The command device then transmits the data frame to the driving device via a serial line. The driving device generates parallel data from the serial data contained in the received data frame, generates multiple control signals on the basis of the parallel data, and transmits the control signals to the respective switching elements.

CITATION LIST

Patent Literature

Patent Literature 1: Unexamined Japanese Patent Application Publication No. H11-178349

SUMMARY OF INVENTION

Technical Problem

Some power conversion apparatuses each controlled by a control apparatus include, in addition to the switching elements in a power conversion circuit, other switching elements independent from the power conversion circuit, such as switching elements in a brake chopper circuit and switching elements in a discharging circuit. In this case, the above-mentioned control apparatus controls the switching elements in the power conversion circuit and the other switching elements independent from the power conversion circuit.

In an exemplary case where a serializer for serial conversion is in conformity with the normal standard of conversion of 8-bit parallel data into serial data and the number of switching elements to be controlled is larger than eight, the command device includes multiple serializers, and the serializers transmit serial data to the driving device via serial lines. Also, the driving device includes multiple deserializers to convert serial data into parallel data, and the serial data input to the deserializers via the serial lines is converted into parallel data.

In other words, the command device transmits a data frame for instructing operations of the switching elements in the power conversion circuit via one serial line to the driving device, and transmits a data frame for instructing operations of other switching elements via another serial line to the driving device. Because of the multiple serial lines for transmission of data frames from the command device to the driving device, the structure for controlling the switching elements in the power conversion circuit and other switching elements independent from the power conversion circuit is to be complicated. This problem is not peculiar to the above-described example but common to control apparatuses for controlling switching elements in power conversion circuits of the power conversion apparatuses and switching elements included in the power conversion apparatuses and independent from the power conversion circuits.

An objective of the present disclosure, which has been accomplished in view of the above situations, is to provide a command device, a driving device, a control apparatus, and a power conversion system having simple structures for controlling switching elements in a power conversion circuit and one or more switching elements independent from the power conversion circuit.

Solution to Problem

In order to achieve the above objective, a command device according to the present disclosure is connected to a driving device via a serial line, which is configured to control operations of a plurality of first switching elements included in a power conversion circuit of a power conversion apparatus and one or more second switching elements included in the power conversion apparatus and independent from the power conversion circuit. The command device includes a command signal generator, an encoder, and a command-device serializer. The command signal generator generates a plurality of first command signals, which are binary signals for instructing operations of the plurality of first switching elements, and one or more second command signals, which are binary signals for instructing operations of the one or more second switching elements. The encoder encodes at least some signals of the plurality of first command signals and the one or more second command signals in accordance with possible combinations of values of at least some signals of the plurality of first command signals and the one or more second command signals, and thereby generates encoded data for instructing the operations of the plurality of first switching elements and the one or more second switching elements. The encoded data is represented in a smaller number of bits than the sum of the number of the plurality of first switching elements and the number of the one or more second switching elements. The command-device serializer generates serial command data through serial conversion of the encoded data, and transmits the serial command data to the driving device via the serial line.

Advantageous Effects of Invention

The command device according to the present disclosure encodes at least some signals of the plurality of first command signals and the one or more second command signals, and thereby generates the encoded data for instructing the operations of the plurality of first switching elements and the one or more second switching elements, which is represented in a smaller number of bits than the sum of the number of the plurality of first switching elements and the number of the second switching elements. The encoded data is subject to serial conversion and then transmitted to the driving device via the serial line. The command device does not need multiple signal lines for the purpose of instructing the operations of the plurality of first switching elements and the one or more second switching elements, and therefore has a simple structure for controlling the plurality of first switching elements and the one or more second switching elements.

BRIEF DESCRIPTION OF DRAWINGS

FIG. 5 illustrates exemplary codes associated with possible combinations of values of first command signals in Embodiment 1;

FIG. 6 illustrates exemplary first command signals, second command signals, and encoded data in Embodiment 1;

FIG. 7 illustrates an exemplary data frame transmitted from the command device according to Embodiment 1;

FIG. 13 illustrates exemplary data output from a selector of the driving device according to Embodiment 2;

FIG. 14 illustrates an exemplary data frame transmitted from the driving device according to Embodiment 2;

FIG. 18 illustrates exemplary codes associated with possible combinations of values of first command signals in Embodiment 3;

FIG. 19 illustrates exemplary first command signals, second command signals, and encoded data in Embodiment 3;

FIG. 21 illustrates exemplary data output from a selector of a driving device according to Embodiment 4;

DESCRIPTION OF EMBODIMENTS

Figure 1:
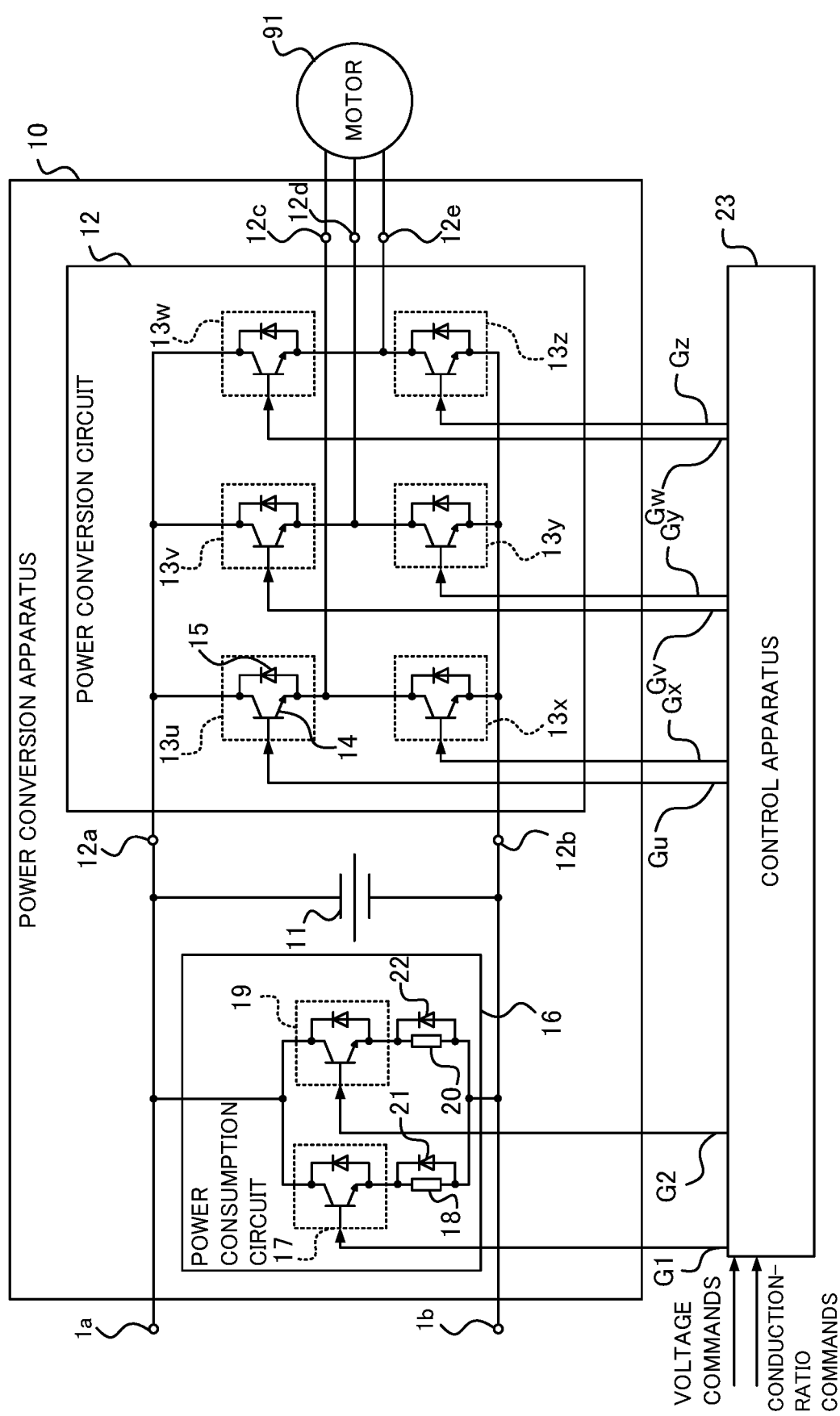
FIG. 1 is a block diagram illustrating a power conversion system according to Embodiment 1.

A command device, a driving device, a control apparatus, and a power conversion system according to embodiments of the present disclosure are described in detail below with reference to the accompanying drawings. In the drawings, the components identical or corresponding to each other are provided with the same reference symbol.

Embodiment 1

The following focuses on a command device and a driving device included in a control apparatus for controlling a power conversion apparatus included in a power conversion system, focusing on an exemplary power conversion system installed in a railway vehicle. In Embodiment 1, a power conversion system 1 is installed in a railway vehicle of a DC feeding system. The power conversion system 1 illustrated in FIG. 1 includes a power conversion apparatus 10 to convert DC power fed from a power source, which is not illustrated, into three-phase AC power for driving a motor 91 and feed the three-phase AC power to the motor 91, and a control apparatus 23 for controlling the power conversion apparatus 10. In Embodiment 1, the power conversion apparatus is a DC-AC converter, and the motor 91 is a three-phase induction motor fed with three-phase AC power and driven to generate a propulsive force of the railway vehicle.

The power conversion apparatus 10 has a positive-electrode terminal 1a to be connected to the power source, and a negative-electrode terminal 1b to be grounded. The power conversion apparatus 10 further includes a power conversion circuit 12 to convert DC power fed via primary terminals 12a and 12b into three-phase AC power for driving the motor 91 and feed the three-phase AC power to the motor 91 via secondary terminals 12c, 12d, and 12e, or convert three-phase AC power fed from the motor 91 serving as an electric generator into DC power and output the DC power via the primary terminals 12a and 12b. The power conversion apparatus 10 also includes a filter capacitor 11 connected to the primary terminals 12a and 12b of the power conversion circuit 12, and a power consumption circuit 16 to consume the DC power output from the power conversion circuit 12 and thereby generate a braking force for decelerating the railway vehicle.

The positive-electrode terminal 1a is preferably electrically connected to the power source via components, such as contactor and reactor, which are not illustrated. The power source corresponds to a current collector to acquire electric power from a substation via a power supply line. Examples of the current collector include a pantograph to acquire electric power via an overhead wire, which is an example of the power supply line, and a contact shoe to acquire electric power via a third rail, which is an example of the power supply line. The negative-electrode terminal 1b is grounded via components, such as ground ring, ground brush, and wheel, which are not illustrated.

The primary terminals 12a and 12b of the power conversion circuit 12 are respectively connected to the positive-electrode terminal 1a and the negative-electrode terminal 1b. In other words, the primary terminal 12a is connected with the positive-electrode terminal 1a to the power source. The primary terminal 12b is grounded. The power conversion circuit 12 includes serially connected first switching elements 13u and 13x, serially connected first switching elements 13v and 13y, and serially connected first switching elements 13w and 13z. The first switching elements 13u and 13x correspond to the U phase of the three-phase AC power. The first switching elements 13v and 13y correspond to the V phase of the three-phase AC power. The first switching elements 13w and 13z correspond to the W phase of the three-phase AC power. The first switching elements 13u and 13x, the first switching elements 13v and 13y, and the first switching elements 13w and 13z are connected in parallel to each other.

The connecting point between the first switching elements 13u and 13x is connected to the secondary terminal 12c. The connecting point between the first switching elements 13v and 13y is connected to the secondary terminal 12d. The connecting point between the first switching elements 13w and 13z is connected to the secondary terminal 12e.

The first switching elements 13u, 13v, 13w, 13x, 13y, and 13z have the identical structure including an insulated gate bipolar transistor (IGBT) 14, and a freewheeling diode 15. The anode of the freewheeling diode 15 is connected to the emitter terminal of the IGBT 14, and the cathode of the freewheeling diode 15 is connected to the collector terminal of the IGBT 14.

The control apparatus 23 controls the first switching elements 13u, 13v, 13w, 13x, 13y, and 13z by feeding first control signals Gu, Gv, Gw, Gx, Gy, and Gz generated by the control apparatus 23 to the respective gate terminals of the IGBTs 14 of the first switching elements 13u, 13v, 13w, 13x, 13y, and 13z. Due to switching operations of the first switching elements 13u, 13v, 13w, 13x, 13y, and 13z, the power conversion circuit 12 converts DC power into three-phase AC power, or converts three-phase AC power into DC power.

The filter capacitor 11 is connected between the primary terminals 12a and 12b of the power conversion circuit 12, and is charged with DC power fed from the power source or the power conversion circuit 12. The filter capacitor 11 reduces harmonic components contained in the DC power fed from the power source or the DC power output from the power conversion circuit 12.

The power consumption circuit 16 is connected in parallel to the filter capacitor 11 in the circuitry between the filter capacitor 11 and the positive- and negative-electrode terminals 1a and 1b. The power consumption circuit 16 includes a second switching element 17 and a resistor 18, which are serially connected, and a second switching element 19 and a resistor 20, which are serially connected. The power consumption circuit 16 preferably further includes a freewheeling diode 21 connected in parallel to the resistor 18, and a freewheeling diode 22 connected in parallel to the resistor 20.

The second switching elements 17 and 19 have the structure identical to that of the first switching elements 13u, 13v, 13w, 13x, 13y, and 13z. The serially connected second switching element 17 and resistor 18 are connected in parallel to the serially connected second switching element 19 and resistor 20. The cathode of the freewheeling diode 21 is connected to one end of the resistor 18 connected to the second switching element 17, and the anode of the freewheeling diode 21 is connected to the other end of the resistor 18. The cathode of the freewheeling diode 22 is connected to one end of the resistor 20 connected to the second switching element 19, and the anode of the freewheeling diode 22 is connected to the other end of the resistor 20.

The control apparatus 23 controls the second switching elements 17 and 19 by feeding second control signals G1 and G2 generated by the control apparatus 23 to the respective gate terminals of the IGBTs 14 of the second switching elements 17 and 19. When at least either of the second switching elements 17 and 19 are turned on while the motor 91 is serving as an electric generator, the electric power generated by the motor 91 is consumed to generate a braking force for decelerating the railway vehicle.

Figure 2:
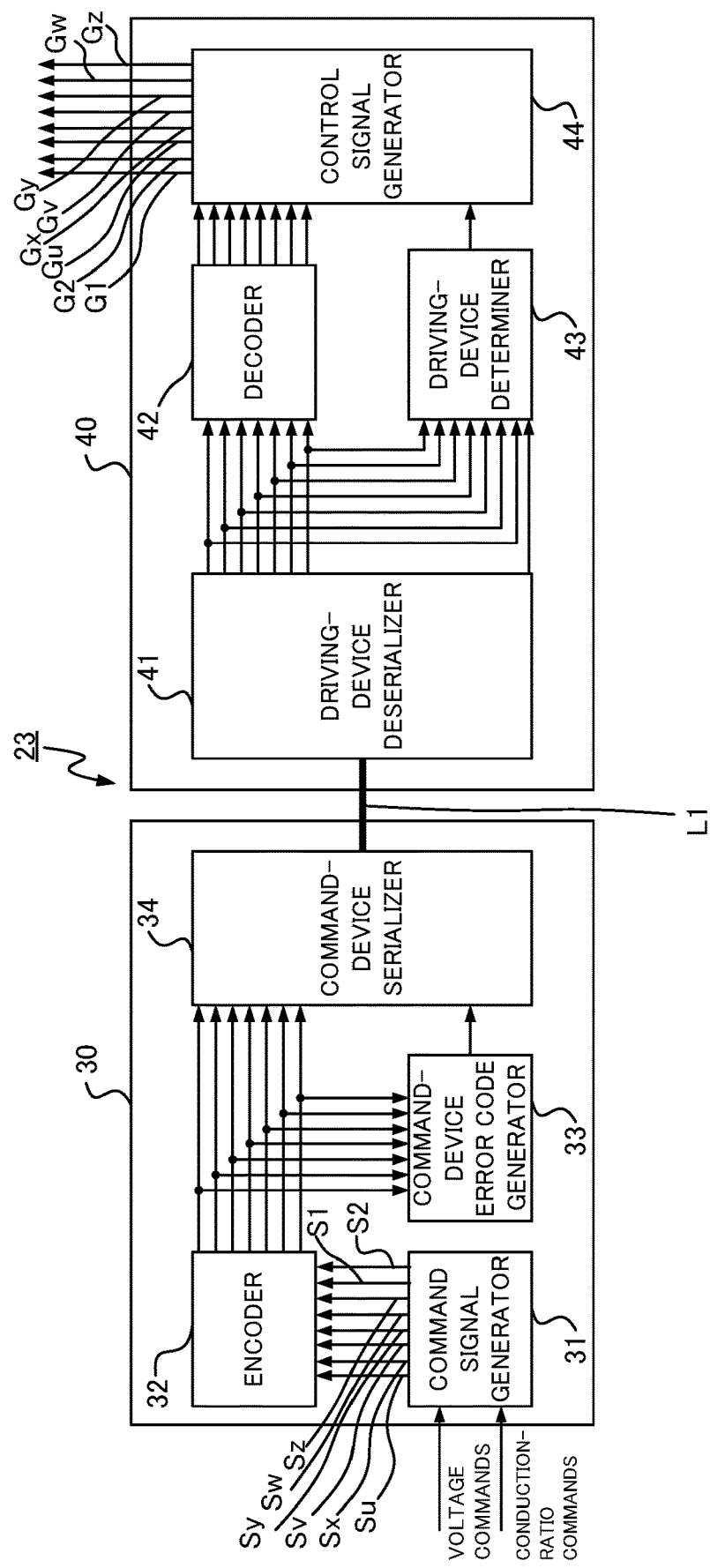
FIG. 2 is a block diagram illustrating a control apparatus according to Embodiment 1.

The following focuses on the control apparatus 23 for controlling the power conversion apparatus 10 having the above-described configuration. As illustrated in FIG. 2, the control apparatus 23 includes a command device 30 to generate command data for instructing the operations of the first switching elements 13u, 13v, 13w, 13x, 13y, and 13z and the second switching elements 17 and 19, and a driving device 40 to generate first control signals Gu, Gv, Gw, Gx, Gy, and Gz and second control signals G1 and G2 in accordance with the command data generated by the command device 30.

The driving device 40 is disposed at a position adjacent to the power conversion apparatus 10, specifically, the power conversion circuit 12. The driving device 40 is made of circuit elements with high withstand voltage. In contrast, the command device 30 is insulated from the power conversion apparatus 10 and is disposed at a position away from the power conversion apparatus 10. The command device 30 therefore does not have to be made of circuit elements with high withstand voltage. The circuit elements with high withstand voltage indicate circuit elements tolerant to voltage applied to the power conversion circuit 12. The command device 30 and the driving device 40 are connected to each other via a serial line L1. The control apparatus 23 does not need multiple signal lines for the purpose of instructing the operations of the first switching elements 13u, 13v, 13w, 13x, 13y, and 13z and the second switching elements 17 and 19, and therefore has a simple structure.

The command device 30 includes a command signal generator 31 to generate first command signals Su, Sv, Sw, Sx, Sy, and Sz for instructing the operations of the first switching elements 13u, 13v, 13w, 13x, 13y, and 13z, in accordance with voltage commands acquired from a voltage command generating circuit, which is not illustrated, and to generate second command signals S1 and S2 for instructing the operations of the second switching elements 17 and 19, in accordance with conduction-ratio commands acquired from a conduction-ratio command generating circuit, which is not illustrated. The command device 30 further includes an encoder 32 to generate encoded data by encoding at least some signals of the first command signals Su, Sv, Sw, Sx, Sy, and Sz and the second command signals S1 and S2, and a command-device serializer 34 to generate serial command data through serial conversion of the encoded data and transmit the serial command data to the driving device 40 via the serial line L1. These components of the command device 30 operate in synchronization with a clock signal output from an oscillator, which is not illustrated.

In order to prevent the first switching elements 13u, 13v, 13w, 13x, 13y, and 13z and the second switching elements 17 and 19 from being controlled on the basis of incorrect command data, the command device 30 preferably further includes a command-device error code generator 33 to generate a command-device error code from the encoded data. In this case, the command-device serializer 34 preferably generates serial command data through serial conversion of the encoded data provided with the command-device error code.

The driving device 40 includes a driving-device deserializer 41 to generate parallel command data through parallel conversion of the serial command data acquired from the command device 30 via the serial line L1, and a decoder 42 to generate decoded data by decoding the encoded data contained in the parallel command data. The driving device 40 further includes a control signal generator 44 to generate first control signals Gu, Gv, Gw, Gx, Gy, and Gz and second control signals G1 and G2 from the decoded data. These components of the driving device 40 operate in synchronization with a clock signal output from an oscillator, which is not illustrated, independent from the command device 30.

In order to prevent the first switching elements $13u$, $13v$, $13w$, $13x$, $13y$, and $13z$ and the second switching elements 17 and 19 from being controlled on the basis of incorrect command data, the driving device 40 preferably further includes a driving-device determiner 43 to determine the existence of an error in the parallel command data on the basis of the command-device error code contained in the parallel instruction data. In this case, the control signal generator 44 preferably generates first control signals Gu, Gv, Gw, Gx, Gy, and Gz and second control signals G1 and G2, on the basis of the decoded data generated from the parallel command data, which is determined by the driving-device determiner 43 to have no error.

Figure 3:
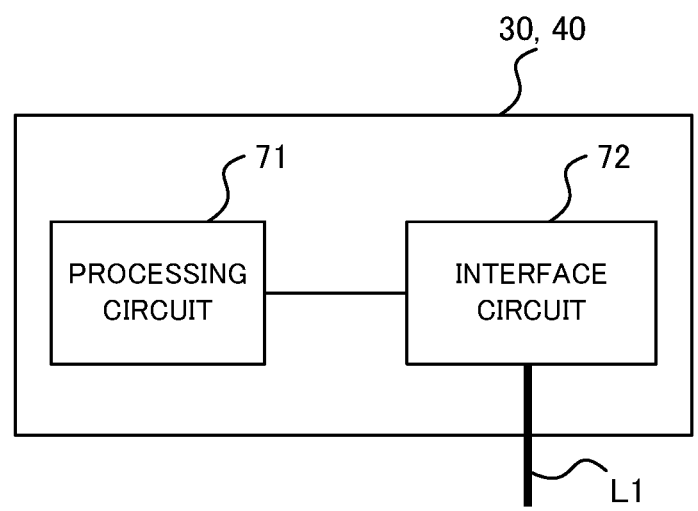
FIG. 3 is a block diagram illustrating a hardware configuration of a command device and a driving device according to Embodiment 1.

As illustrated in FIG. 3, the command device 30 and the driving device 40 having the above-described configurations are each achieved by a processing circuit 71. The processing circuit 71 is connected to the serial line L1 via an interface circuit 72. In the case where the processing circuit 71 is dedicated hardware, the processing circuit 71 is a single circuit, a combined circuit, a programmed processor, a parallel programmed processor, an application specific integrated circuit (ASIC), a field programmable gate array (FPGA), or a combination thereof, for example.

The command signal generator 31, the encoder 32, the command-device error code generator 33, and the command-device serializer 34 may be achieved by separate processing circuits 71. Alternatively, the command signal generator 31, the encoder 32, the command-device error code generator 33, and the command-device serializer 34 may be achieved by a common processing circuit 71.

The driving-device deserializer 41, the decoder 42, the driving-device determiner 43, and the control signal generator 44 may be achieved by separate processing circuits 71. Alternatively, the driving-device deserializer 41, the decoder 42, the driving-device determiner 43, and the control signal generator 44 may be achieved by a common processing circuit 71.

The following focuses on an operation of the control apparatus 23 having the above-described configuration.

Figure 4:
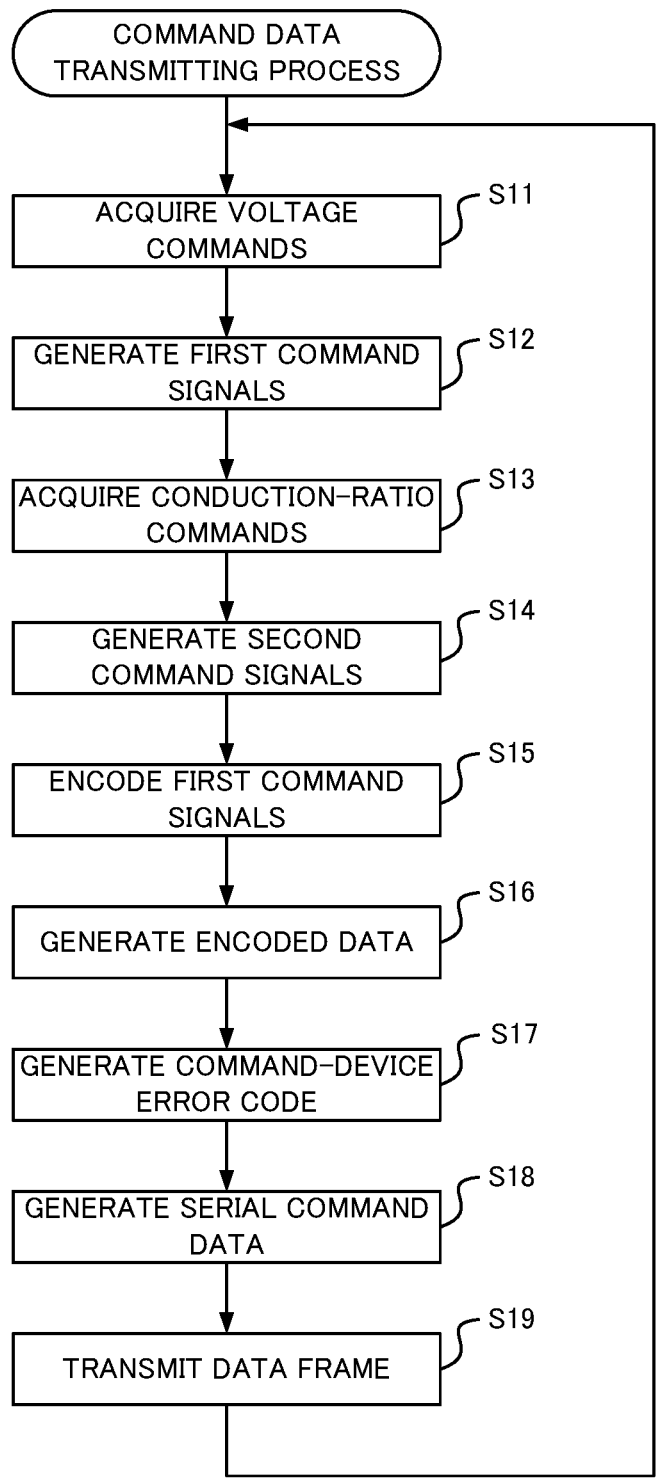
FIG. 4 is a flowchart illustrating steps of a command data transmitting process executed by the command device according to Embodiment 1.

The command device 30 of the control apparatus 23, when acquiring voltage commands from the voltage command generating circuit, initiates the command data transmitting process illustrated in FIG. 4. The command signal generator 31 acquires, from the voltage command generating circuit, voltage commands indicating target values of the U-phase voltage, V-phase voltage, and W-phase voltage output from the power conversion circuit 12 (Step S11).

The command signal generator 31 compares the triangular wave generated on the basis of a clock signal with the voltage commands acquired in Step S11, and thereby generates first command signals Su, Sv, Sw, Sx, Sy, and Sz, which are pulse width modulation (PWM) signals (Step S12). The first command signals Su, Sv, Sw, Sx, Sy, and Sz are binary signals. The first command signals Su, Sv, Sw, Sx, Sy, and Sz have a value of 1 indicating the on state, or a value of 0 indicating the off state, for example.

In detail, the command signal generator 31 compares the triangular wave with the target value of the U-phase voltage, and thereby generates first command signals Su and Sx. The command signal generator 31 compares the triangular wave with the target value of the V-phase voltage, and thereby generates first command signals Sv and Sy. The command signal generator 31 compares the triangular wave with the target value of the W-phase voltage, and thereby generates first command signals Sw and Sz.

The command signal generator 31 acquires conduction-ratio commands indicating target values of the conduction ratios of the second switching elements 17 and 19, from the conduction-ratio command generating circuit (Step S13). The command signal generator 31 generates second command signals S1 and S2, which are PWM signals having on and off periods adjusted in accordance with the target values of the conduction ratios indicated by the conduction-ratio commands (Step S14). The second command signals S1 and S2 are binary signals. The second command signals S1 and S2 have a value of 1 indicating the on state, or a value of 0 indicating the off state, for example.

The command signal generator 31 executes parallel transmission of the first command signals Su, Sv, Sw, Sx, Sy, and Sz generated in Step S12 and the second command signals S1 and S2 generated in Step S14, to the encoder 32.

The encoder 32 encodes at least some signals of the first command signals Su, Sv, Sw, Sx, Sy, and Sz and the second command signals S1 and S2. In Embodiment 1, the encoder 32 encodes the first command signals Su, Sv, Sw, Sx, Sy, and Sz, on the basis of the codes associated with possible combinations of values of the first command signals Su, Sv, Sw, Sx, Sy, and Sz (Step S15).

The first switching elements $13u$ and $13x$ illustrated in FIG. 1 are never simultaneously in the on states, the first switching elements $13v$ and $13y$ are never simultaneously in the on states, and the first switching elements $13w$ and $13z$ are never simultaneously in the on states. The possible combinations of values of the first command signals Su, Sv, Sw, Sx, Sy, and Sz thus have 27 patterns. Accordingly, a possible combination of values of the first command signals Su, Sv, Sw, Sx, Sy, and Sz can be represented in a five-figure binary. The encoder 32 thus generates a 5-bit code of bits C0 to C4 corresponding to the values of the first command signals Su, Sv, Sw, Sx, Sy, and Sz, on the basis of the 5-bit codes associated with possible combinations of values of the first command signals Su, Sv, Sw, Sx, Sy, and Sz, as illustrated in FIG. 5.

As illustrated in FIG. 4, the encoder 32 generates encoded data containing the 5-bit data, generated by encoding the first command signals Su, Sv, Sw, Sx, Sy, and Sz, and the second command signals S1 and S2 (Step S16). In detail, the encoder 32 generates 7-bit encoded data containing the 5-bit data of bits C0 to C4 and the data of bits C6 and C5 corresponding to the second command signals S1 and S2, as illustrated in FIG. 6. The encoder 32 then executes parallel transmission of the encoded data to the command-device error code generator 33 and the command-device serializer 34.

As illustrated in FIG. 4, the command-device error code generator 33 generates a command-device error code on the basis of the encoded data (Step S17). The command-device error code is an odd parity bit, for example. The command-device error code generator 33 transmits the generated command-device error code to the command-device serializer 34.

The command-device serializer 34 is in conformity with the standard of conversion of 8-bit parallel data into serial data. The command-device serializer 34 generates serial command data containing the encoded data of bits C0 to C6 and a command-device error code P1, through serial conversion of the encoded data provided with the command-device error code (Step S18). In Embodiment 1, the command-device serializer 34 executes serial conversion of 8-bit data to generate the serial command data.

Figure 7:
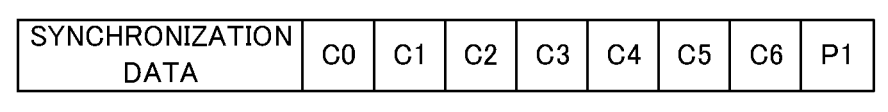

The command-device serializer 34 generates a data frame containing synchronization data and serial command data following the synchronization data, as illustrated in FIG. 7. As illustrated in FIG. 4, the command-device serializer 34 then transmits the data frame to the driving device 40 via the serial line L1 (Step S19). The command device 30 repeats the above-described steps, while voltage commands are being input from the voltage command generating circuit.

Figure 8:
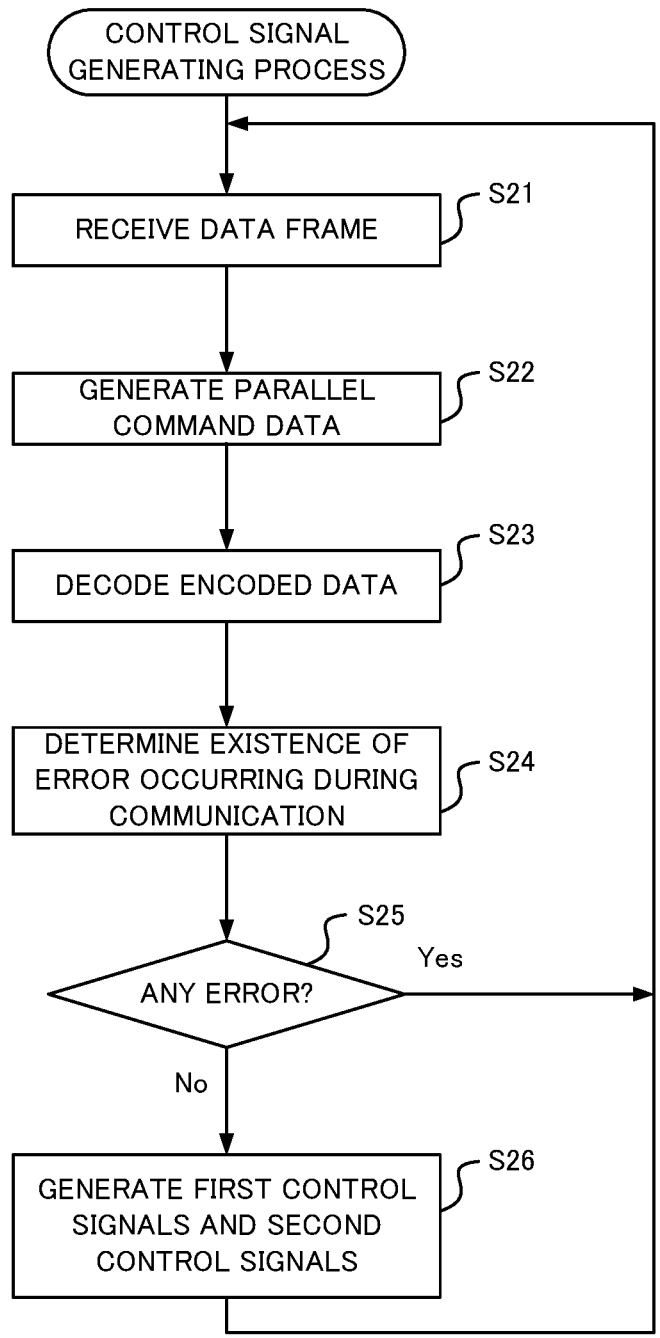
FIG. 8 is a flowchart illustrating steps of a control signal generating process executed by the driving device according to Embodiment 1.

The driving device 40, when receiving the data frame from the command device 30, initiates the control signal generating process illustrated in FIG. 8. The driving-device deserializer 41 receives the data frame from the command device 30 via the serial line L1 (Step S21). The driving-device deserializer 41 then detects and synchronizes the synchronization data contained in the data frame, and detects the serial command data from the data frame. In Embodiment 1, the driving-device deserializer 41 generates 8-bit parallel command data through parallel conversion of the detected serial command data (Step S22). In detail, the driving-device deserializer 41 extracts the data of bits C0 to C6 and the command-device error code P1, from the data frame illustrated in FIG. 7.

The driving-device deserializer 41 then executes parallel transmission of the parallel command data except for the command-device error code to the decoder 42, and executes parallel transmission of the parallel command data to the driving-device determiner 43.

The decoder 42 decodes the encoded data contained in the parallel command data (Step S23). In detail, the decoder 42 decodes subject data, specifically, the data of bits C0 to C4 illustrated in FIG. 7, which corresponds to the first switching elements 13$u$, 13$v$, 13$w$, 13$x$, 13$y$, and 13$z$. The decoder 42 then generates decoded data, containing the decoded data corresponding to the first switching elements 13$u$, 13$v$, 13$w$, 13$x$, 13$y$, and 13$z$ and the data corresponding to the second switching elements 17 and 19.

The driving-device determiner 43 detects the command-device error code contained in the parallel command data. As illustrated in FIG. 8, the driving-device determiner 43 then determines whether any error occurs in the data during communication, on the basis of the command-device error code and the parallel command data except for the command-device error code (Step S24). In detail, the driving-device determiner 43 calculates the number of pieces of data having a value of 1 in the parallel command data except for the command-device error code. When the number of pieces of data having a value of 1 is an odd number and the command-device error code is 1, or when the number of pieces of data having a value of 1 is an even number and the command-device error code is 0, no error is deemed to occur in the parallel command data. In contrast, when the number of pieces of data having a value of 1 is an odd number and the command-device error code is 0, or when the number of pieces of data having a value of 1 is an even number and the command-device error code is 1, any error is deemed to occur in the parallel command data.

When no error is determined to occur in the data during communication in Step S24 (Step S25; No), the control signal generator 44 generates first control signals Gu, Gv, Gw, Gx, Gy, and Gz and second control signals G1 and G2, on the basis of the parallel command data (Step S26). After completion of Step S26, the above-described steps from Step S21 are repeated.

The first control signals Gu, Gv, Gw, Gx, Gy, and Gz and the second control signals G1 and G2 are voltage signals. The first control signals Gu, Gv, Gw, Gx, Gy, and Gz and the second control signals G1 and G2 are fed to the respective gate terminals of the IGBTs 14 of the first switching elements 13$u$, 13$v$, 13$w$, 13$x$, 13$y$, and 13$z$ and the second switching elements 17 and 19, and thereby the first switching elements 13$u$, 13$v$, 13$w$, 13$x$, 13$y$, and 13$z$ and the second switching elements 17 and 19 are controlled. The control signal generator 44 varies the voltage values of the first control signals Gu, Gv, Gw, Gx, Gy, and Gz and the second control signals G1 and G2, in accordance with values of the parallel command data.

When any error is determined to occur in the data during communication in Step S24 (Step S25; Yes), Step S26 is skipped, and the above-described steps from Step S21 are repeated. In this case, the control signal generator 44 may keep outputting the most recently generated first control signals Gu, Gv, Gw, Gx, Gy, and Gz and second control signals G1 and G2.

Figure 9:
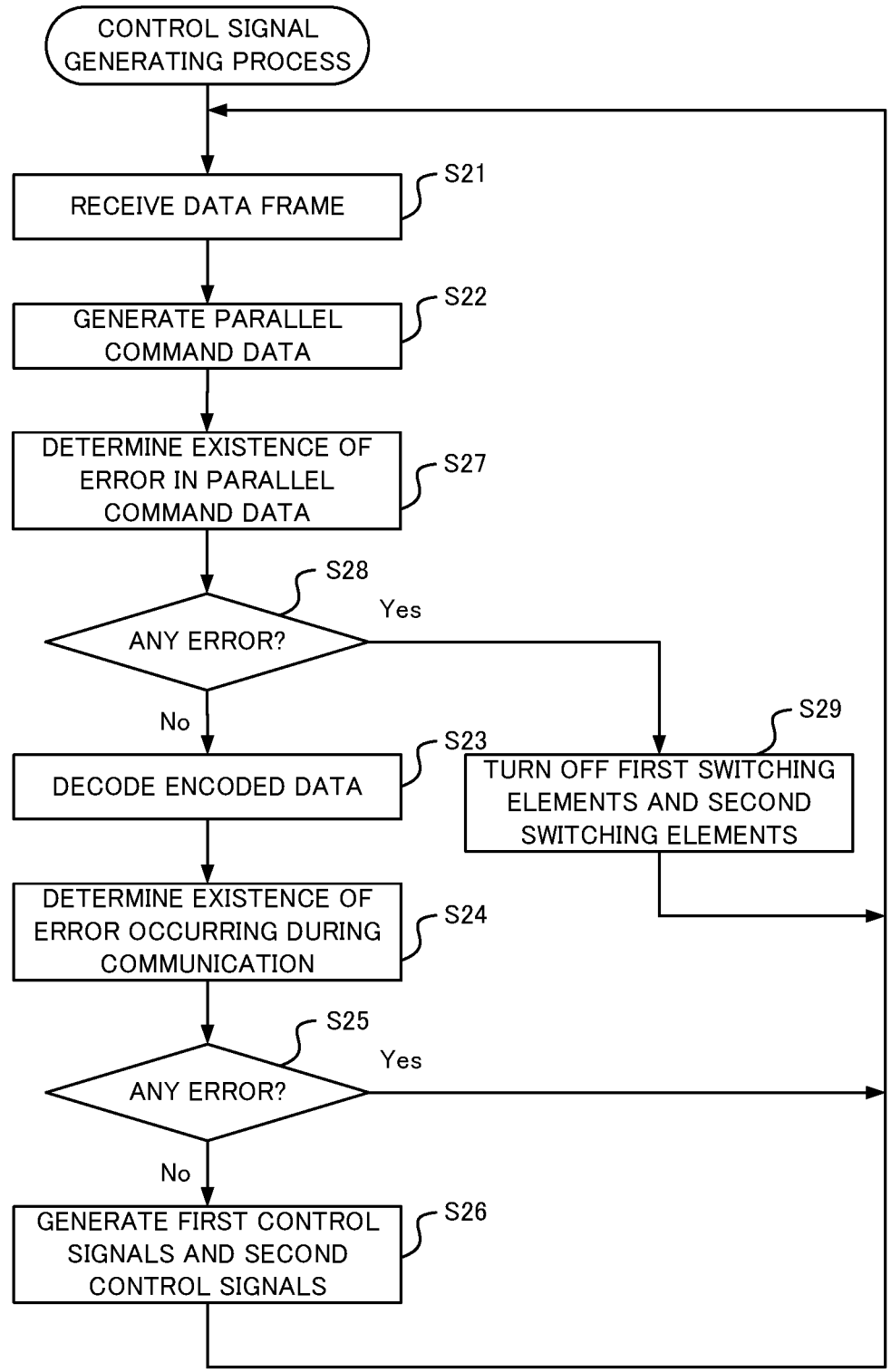
FIG. 9 is a flowchart illustrating modified steps of the control signal generating process executed by the driving device according to Embodiment 1.

In order to improve the safety of the control of the power conversion circuit 12, the decoder 42 preferably determines the existence of an abnormality in the parallel command data. In detail, the decoder 42 preferably determines whether the parallel command data except for the command-device error code has any error, as illustrated in FIG. 9 (Step S27). In FIG. 9, Steps S21 to S26 are identical to Steps S21 to S26 in FIG. 8.

The decoder 42 preliminarily retains information on the codes associated with possible combinations of values of the first command signals Su, Sv, Sw, Sx, Sy, and Sz illustrated in FIG. 5. The decoder 42 then determines whether the encoded data contained in the parallel command data matches any of the associated codes. When the encoded data matches any of the associated codes, no error is deemed to occur in the parallel command data. As illustrated in FIG. 9, when the decoder 42 determines that the encoded data matches any of the associated codes, that is, when the parallel command data has no error (Step S28; No), Step S23 and the following steps are executed.

In contrast, when the encoded data matches none of the associated codes, any error is deemed to occur in the parallel command data. When the decoder 42 determines that the encoded data matches none of the associated codes, that is, the parallel command data has any error (Step S28; Yes), the decoder 42 generates decoded data for instructing all the first switching elements 13$u$, 13$v$, 13$w$, 13$x$, 13$y$, and 13$z$ and the second switching elements 17 and 19 to be turned off.

The control signal generator 44 then generates first control signals Gu, Gv, Gw, Gx, Gy, and Gz and second control signals G1 and G2 for causing the first switching elements 13$u$, 13$v$, 13$w$, 13$x$, 13$y$, and 13$z$ and the second switching elements 17 and 19 to be turned off (Step S29). This step can prevent the power conversion circuit 12 from being controlled on the basis of abnormal data. After completion of Step S29, the above-described steps from Step S21 are repeated.

Figure 10:
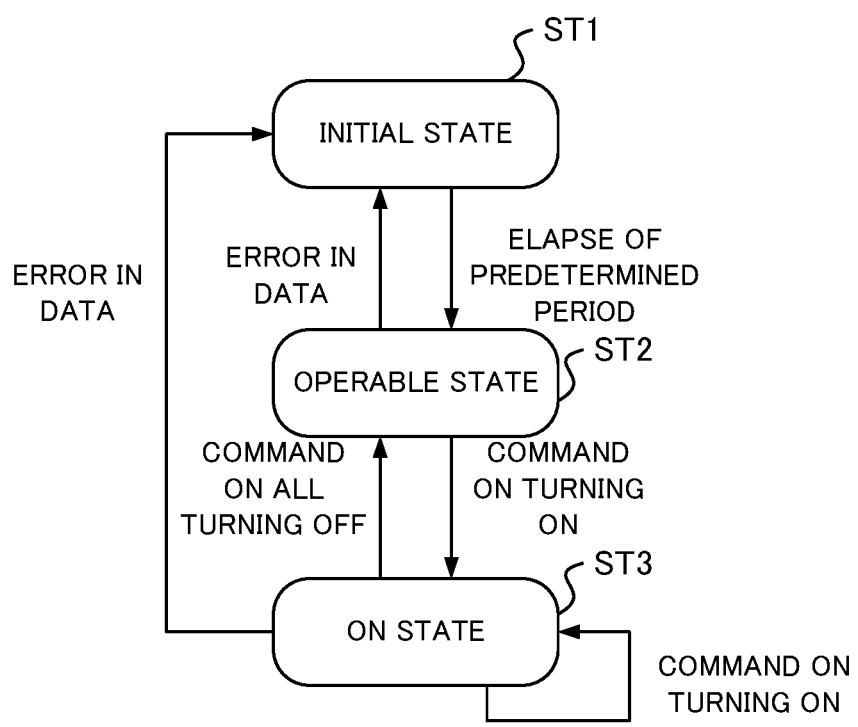
FIG. 10 is a state transition diagram of a decoder of the driving device according to Embodiment 1.

In the case where the decoder 42 is responsible for determination of the existence of an abnormality in the parallel command data, the decoder 42 preferably operates in accordance with the state transition diagram illustrated in FIG. 10. In response to start of power feeding from the power source, the decoder 42 becomes the initial state ST1. In the initial state ST1, the decoder 42 does not start the operation regardless of acquisition of the parallel command data from the driving-device deserializer 41. After the elapse of a predetermined period since the start of the initial state ST1, the decoder 42 transits to the operable state ST2.

After the transition to the operable state ST2, the decoder 42 initiates the operation. In detail, the decoder 42 determines whether the parallel command data has any error. When the parallel command data has no error, the decoder 42 performs a decoding operation. When the decoded data indicates turning on any of the first switching elements 13$u$, 13$v$, 13$w$, 13$x$, 13$y$, and 13$z$ and the second switching elements 17 and 19, the decoder 42 transits to the on state ST3.

In the on state ST3, the decoder 42 determines whether the parallel command data has any error. When the parallel command data has no error, the decoder 42 performs a decoding operation. When the decoded data indicates turning on any of the first switching elements 13$u$, 13$v$, 13$w$, 13$x$, 13$y$, and 13$z$ and the second switching elements 17 and 19, the decoder 42 remains in the on state ST3. When the decoded data indicates turning off all the first switching elements 13$u$, 13$v$, 13$w$, 13$x$, 13$y$, and 13$z$ and the second switching elements 17 and 19, the decoder 42 generates decoded data for instructing all the first switching elements 13$u$, 13$v$, 13$w$, 13$x$, 13$y$, and 13$z$ and the second switching elements 17 and 19 to be turned off, and transits to the operable state ST2.

When any error occurs in the parallel command data while the decoder 42 is in the operable state ST2 or the on state ST3, the decoder 42 generates decoded data for instructing all the first switching elements 13$u$, 13$v$, 13$w$, 13$x$, 13$y$, and 13$z$ and the second switching elements 17 and 19 to be turned off, and transits to the initial state ST1. After the elapse of the predetermined period, the decoder 42 transits to the operable state ST2 and becomes operable. Since the decoder 42 transits to the initial state ST1 and holts the operation during the predetermined period in response to occurrence of any error in the parallel command data, the power conversion circuit 12 can be prevented from being controlled on the basis of abnormal data.

As described above, the command device 30 and the driving device 40 of the control apparatus 23 according to Embodiment 1 are connected to each other with the single serial line L1. The command device 30 transmits serial command data for controlling the first switching elements 13$u$, 13$v$, 13$w$, 13$x$, 13$y$, and 13$z$ and the second switching elements 17 and 19 to the driving device 40 via the serial line L1, so that the driving device 40 is able to control the first switching elements 13$u$, 13$v$, 13$w$, 13$x$, 13$y$, and 13$z$ and the second switching elements 17 and 19.

The devices do not need multiple signal lines for the purpose of instructing the operations of the first switching elements 13$u$, 13$v$, 13$w$, 13$x$, 13$y$, and 13$z$ and the second switching elements 17 and 19, and therefore have simple structures for controlling the first switching elements 13$u$, 13$v$, 13$w$, 13$x$, 13$y$, and 13$z$ and the second switching elements 17 and 19.

The decoder 42 responsible for determination of the existence of an abnormality in the parallel command data can prevent the power conversion circuit 12 from being controlled on the basis of abnormal data and improve the safety of the control of the power conversion circuit 12.

Embodiment 2

The control apparatus may execute feedback control of the first switching elements 13$u$, 13$v$, 13$w$, 13$x$, 13$y$, and 13$z$ and the second switching elements 17 and 19. The description of Embodiment 2 is directed to a control apparatus 24 having a simple structure to control the first switching elements 13$u$, 13$v$, 13$w$, 13$x$, 13$y$, and 13$z$ and the second switching elements 17 and 19 on the basis of data indicating on/off states of the first switching elements 13$u$, 13$v$, 13$w$, 13$x$, 13$y$, and 13$z$ and the second switching elements 17 and 19.

Figure 11:
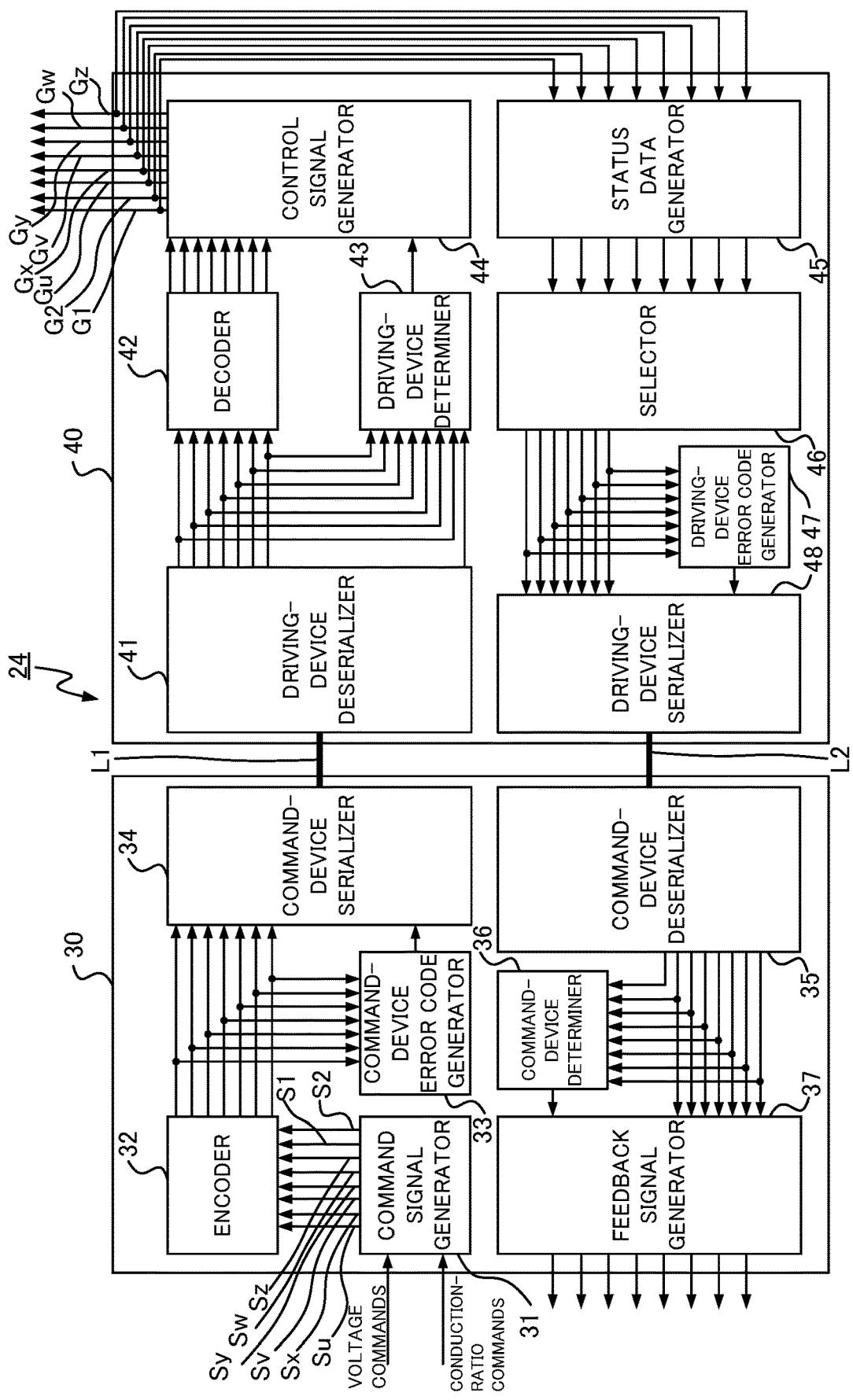
FIG. 11 is a block diagram illustrating a control apparatus according to Embodiment 2.

The control apparatus 24 illustrated in FIG. 11 controls the power conversion apparatus 10, which has the same configuration as that in Embodiment 1. The control apparatus 24 is described below focusing on the differences from the control apparatus 23 of the power conversion system 1 according to Embodiment 1.

The driving device 40 of the control apparatus 24 generates status data indicating on/off states of the first switching elements 13$u$, 13$v$, 13$w$, 13$x$, 13$y$, and 13$z$ and the second switching elements 17 and 19, and transmits serial status data obtained through serial conversion of the status data, to the command device 30.

The command device 30 generates feedback signals indicating on/off states of the first switching elements 13$u$, 13$v$, 13$w$, 13$x$, 13$y$, and 13$z$ and the second switching elements 17 and 19, from the serial status data, and transmits the feedback signals to the voltage command generating circuit and the conduction-ratio command generating circuit. The voltage command generating circuit adjusts the voltage commands in accordance with the feedback signals. The conduction-ratio command generating circuit adjusts the conduction-ratio in accordance with the feedback signals. The control apparatus 24 can thus achieve feedback control of the first switching elements 13$u$, 13$v$, 13$w$, 13$x$, 13$y$, and 13$z$ and the second switching elements 17 and 19.

The driving device 40 and the command device 30 are connected to each other with a serial line L2, for the purpose of transmission and reception of serial status data.

The following focuses on configurations of the driving device 40 and the command device 30.

The driving device 40 includes, in addition to the components of the driving device according to Embodiment 1, a status data generator 45 to generate status data, which is binary data indicating on/off states of the first switching elements 13$u$, 13$v$, 13$w$, 13$x$, 13$y$, and 13$z$ and the second switching elements 17 and 19, and a selector 46 to divide the status data into segments of a predetermined number of bits and output the divided status data. The driving device 40 further includes a driving-device serializer 48 to generate serial status data through serial conversion of the data output from the selector 46, and transmit the serial status data to the command device 30 via the serial line L2.

In order to prevent the first switching elements 13$u$, 13$v$, 13$w$, 13$x$, 13$y$, and 13$z$ and the second switching elements 17 and 19 from being subject to feedback control based on incorrect status data, the driving device 40 preferably further includes a driving-device error code generator 47 to generate a driving-device error code from the data output from the selector 46. In this case, the driving-device serializer 48 preferably performs serial conversion of the data configured by adding the driving-device error code to the data output from the selector 46, to generate the serial status data.

The command device 30 includes a command-device deserializer 35 to generate parallel status data through parallel conversion of the serial status data, which is acquired from the driving device 40 via the serial line L2, and a feedback signal generator 37 to generate feedback signals from the parallel status data and output the feedback signals.

In order to prevent the first switching elements 13u, 13v, 13w, 13x, 13y, and 13z and the second switching elements 17 and 19 from being subject to feedback control based on incorrect status data, the command device 30 preferably further includes a command-device determiner 36 to determine the existence of an error in the parallel status data on the basis of the driving-device error code contained in the parallel status data. In this case, the feedback signal generator 37 preferably generates the feedback signals from the parallel status data, which is determined by the command-device determiner 36 to have no error.

The command device 30 and the driving device 40 have the same hardware configuration as that illustrated in FIG. 3, except for that the processing circuit 71 is connected to the serial lines L1 and L2 via the interface circuit 72.

The following focuses on an operation of the control apparatus 24 having the above-described configuration.

Figure 12:
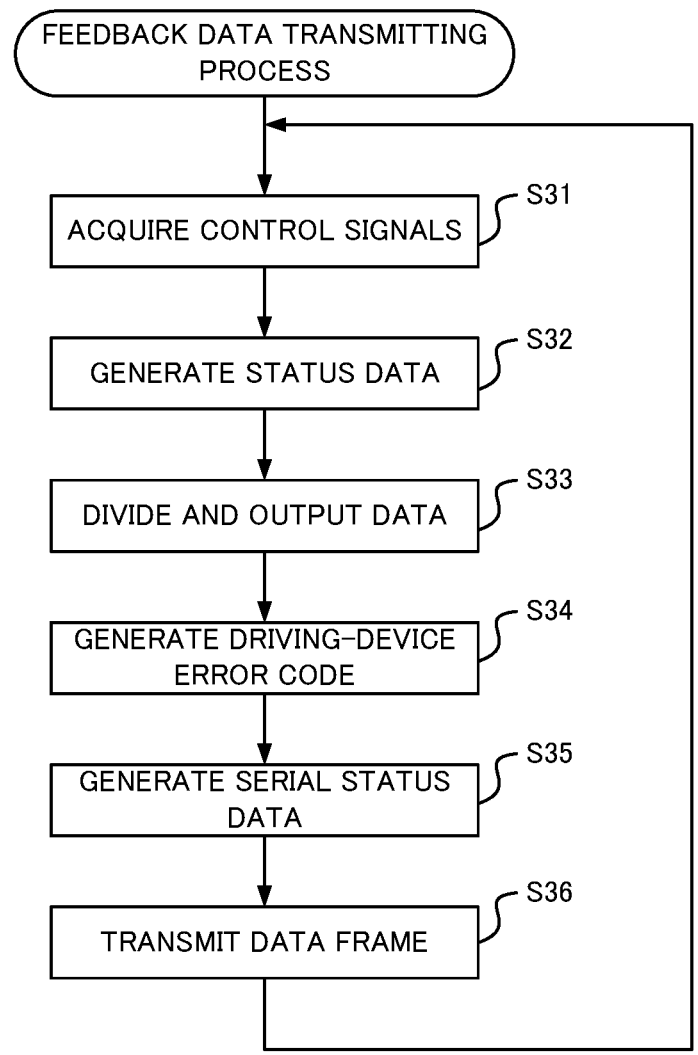
FIG. 12 is a flowchart illustrating steps of a feedback data transmitting process executed by a driving device according to Embodiment 2.

The driving device 40 of the control apparatus 24, when receiving the data frame from the command device 30, initiates the feedback data transmitting process illustrated in FIG. 12. The status data generator 45 acquires the first control signals Gu, Gv, Gw, Gx, Gy, and Gz and the second control signals G1 and G2 being fed to the respective gate terminals of the IGBTs 14 of the first switching elements 13u, 13v, 13w, 13x, 13y, and 13z and the second switching elements 17 and 19 (Step S31). In detail, the status data generator 45 measures voltage values of the first control signals Gu, Gv, Gw, Gx, Gy, and Gz and the second control signals G1 and G2.

The status data generator 45 then generates status data by converting the measured voltage values into digital data (Step S32). The status data generator 45 executes parallel transmission of the generated status data to the selector 46.

In Embodiment 2, the status data is 8-bit data. The selector 46 divides the status data and outputs the divided data (Step S33), because the driving-device serializer 48 is in conformity with the standard of conversion of 8-bit parallel data into serial data, like the command-device serializer 34. In detail, the selector 46 divides the status data into the data group indicating on/off states of the first switching elements 13u, 13v, and 13w and the second switching element 17 and the data group indicating on/off states of the first switching elements 13x, 13y, and 13z and the second switching element 19, as illustrated in FIG. 13, adds codes for identifying the data groups to the divided data, and outputs the resulting data in parallel.

In the example illustrated in FIG. 13, the data of bit D6 contained in the data output from the selector 46 indicates an identification code for identifying the data group. In an exemplary case where the data of bit D6 is 0, the data output from the selector 46 corresponds to the data group indicating on/off states of the first switching elements 13u, 13v, and 13w and the second switching element 17. In another exemplary case where the data of bit D6 is 1, the data output from the selector 46 corresponds to the data group indicating on/off states of the first switching elements 13x, 13y, and 13z and the second switching element 19.

Since the above-mentioned data groups indicating on/off states are 4-bit data, 0 is set to the unused bits D5 and D4. The data of bit D3 indicates an on/off state of the first switching element 13u or the first switching element 13x. The data of bit D2 indicates an on/off state of the first switching element 13v or the first switching element 13y. The data of bit D1 indicates an on/off state of the first switching element 13w or the first switching element 13z. The data of bit DO indicates an on/off state of the second switching element 17 or the second switching element 19. The selector 46 generates 7-bit data of bits D0 to D6 as described above, and executes parallel transmission of the generated data to the driving-device serializer 48 and the driving-device error code generator 47.

As illustrated in FIG. 12, the driving-device error code generator 47 generates a driving-device error code on the basis of the data output from the selector 46 (Step S34). The driving-device error code is an odd parity bit, for example. The driving-device error code generator 47 transmits the generated driving-device error code to the driving-device serializer 48.

The driving-device serializer 48 generates serial status data containing the data of bits D0 to D6 and a driving-device error code P2, through serial conversion of the data output from the selector 46 and provided with the driving-device error code (Step S35). In detail, the driving-device serializer 48 converts 8-bit data into serial data.

The driving-device serializer 48 generates a data frame containing synchronization data and the serial status data following the synchronization data, as illustrated in FIG. 14. As illustrated in FIG. 12, the driving-device serializer 48 then transmits the data frame to the command device 30 via the serial line L2 (Step S36). The driving device 40 repeats the above-described steps, while a data frame is being input from the command device 30.

Figure 15:
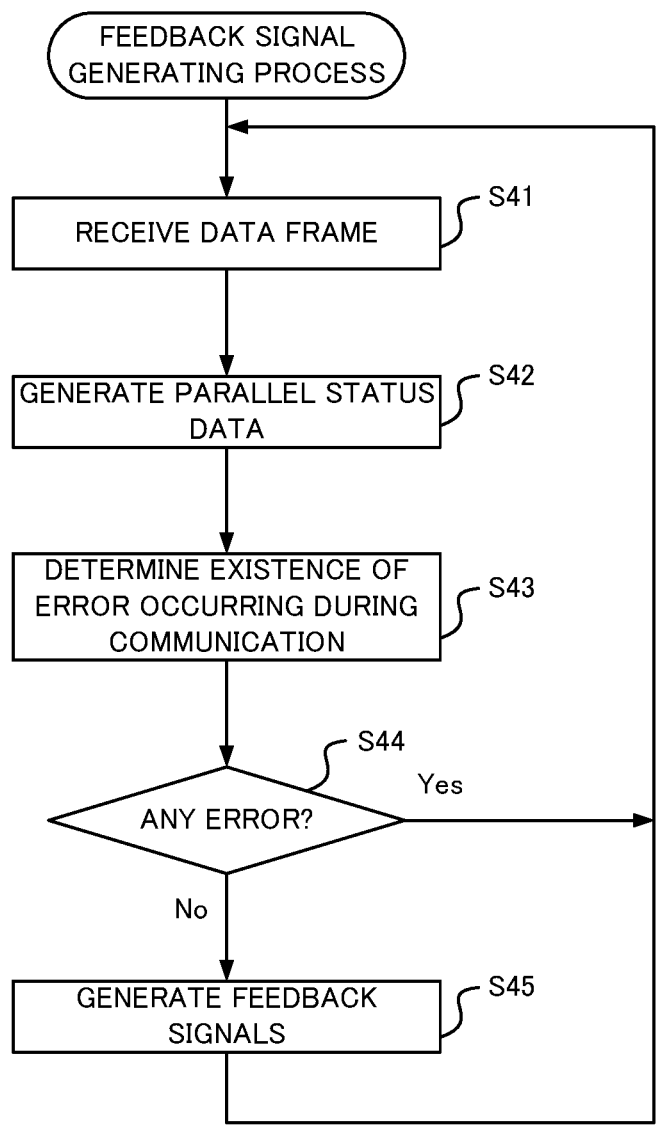
FIG. 15 is a flowchart illustrating steps of a feedback signal generating process executed by the control apparatus according to Embodiment 2.

The command device 30, when receiving the data frame from the driving device 40, initiates the feedback signal generating process illustrated in FIG. 15. The command-device deserializer 35 receives the data frame from the driving device 40 via the serial line L2 (Step S41). The command-device deserializer 35 then detects the synchronization data contained in the data frame and synchronizes the operations, and detects the serial status data from the data frame. In Embodiment 2, the command-device deserializer 35 generates 8-bit parallel status data through parallel conversion of the detected serial status data (Step S42). In detail, the command-device deserializer 35 extracts the data of bits D0 to D6 and the driving-device error code P2 from the data frame illustrated in FIG. 14.

The command-device deserializer 35 then executes parallel transmission of the parallel status data to the command-device determiner 36, and executes parallel transmission of the parallel status data except for the driving-device error code to the feedback signal generator 37.

The command-device determiner 36 detects the driving-device error code contained in the parallel status data. As illustrated in FIG. 15, the command-device determiner 36 then determines whether any error occurs in the data during communication, on the basis of the driving-device error code and the parallel status data except for the driving-device error code (Step S43). In detail, the command-device determiner 36 calculates the number of pieces of data having a value of 1 in the parallel status data except for the driving-device error code. When the number of pieces of data having a value of 1 is an odd number and the driving-device error code is 1, or when the number of pieces of data having a value of 1 is an even number and the command-device error code is 0, the parallel status data is deemed to have no error. In contrast, when the number of pieces of data having a value of 1 is an odd number and the driving-device error code is 0, or when the number of pieces of data having a value of 1 is an even number and the driving-device error code is 1, the parallel status data is deemed to have any error.

When no error is determined to occur in the data during communication in Step S43 (Step S44; No), the feedback signal generator 37 generates feedback signals on the basis of the parallel status data (Step S45). After completion of Step S45, the above-described steps from Step S41 are repeated.

In detail, when the identification code contained in the parallel status data is 0, the feedback signal generator 37 generates feedback signals indicating on/off states of the first switching elements 13u, 13v, and 13w and the second switching element 17, from the parallel status data. When the identification code contained in the parallel status data is 1, the feedback signal generator 37 generates feedback signals indicating on/off states of the first switching elements 13x, 13y, and 13z and the second switching element 19, from the parallel status data.

When any error is determined to occur in the data during communication in Step S43 (Step S44; Yes), Step S45 is skipped, and the above-described steps from Step S41 are repeated. In this case, the feedback signal generator 37 keeps outputting the most recently generated feedback signals.

As described above, the command device 30 and the driving device 40 of the control apparatus 24 according to Embodiment 2 are connected to each other with the serial line L2, for the purpose of transmission and reception of serial status data, which indicates on/off states of the first switching elements 13u, 13v, 13w, 13x, 13y, and 13z and the second switching elements 17 and 19. The devices do not need multiple signal lines for the purpose of transmission and reception of data indicating on/off states of the first switching elements 13u, 13v, 13w, 13x, 13y, and 13z and the second switching elements 17 and 19, and therefore have simple structures for feedback control of the first switching elements 13u, 13v, 13w, 13x, 13y, and 13z and the second switching elements 17 and 19.

Embodiment 3

Although the descriptions of Embodiments 1 and 2 are directed to the control apparatuses 23 and 24 for controlling the power conversion apparatus 10 that converts DC power into three-phase AC power, the control apparatuses 23 and 24 may control power conversion apparatuses other than the power conversion apparatus 10 for converting DC power into three-phase AC power. The description of Embodiment 3 is directed to control of a power conversion apparatus that converts single-phase AC power into three-phase AC power.

Figure 16:
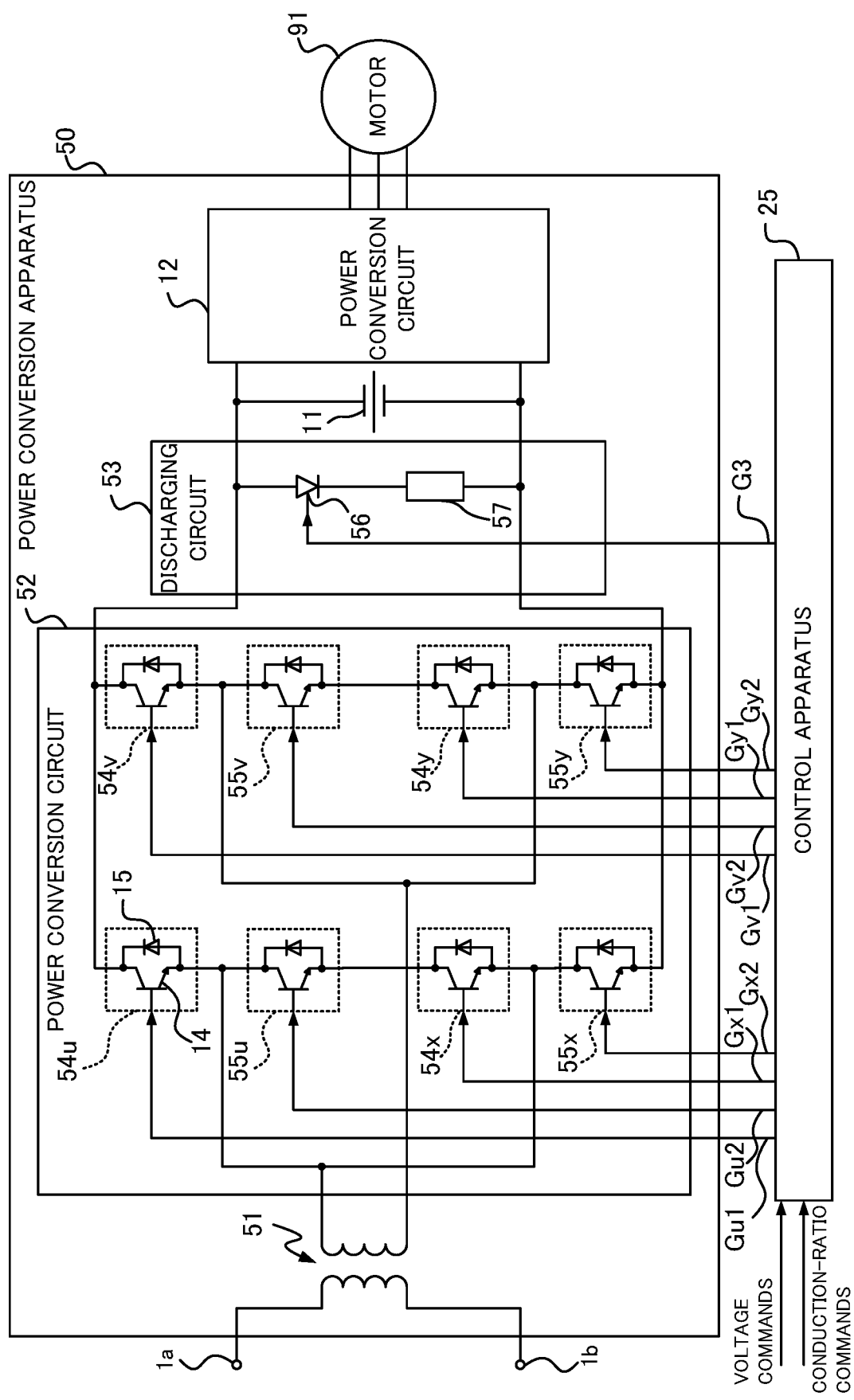
FIG. 16 is a block diagram illustrating a power conversion system according to Embodiment 3.

A power conversion system 2 illustrated in FIG. 16 is installed in a railway vehicle of an AC feeding system. The power conversion system 2 is described below focusing on the differences from the power conversion system 1 according to Embodiment 1.

The power conversion system 2 includes a power conversion apparatus 50 to convert single-phase AC power fed from the power source into three-phase AC power for driving the motor 91 and feed the three-phase AC power to the motor 91, and a control apparatus 25 to control the power conversion apparatus 50. The motor 91 is fed with three-phase AC power from the power conversion apparatus 50 and driven to generate a propulsive force of the railway vehicle.

The power conversion apparatus 50 includes a transformer 51 to lower the voltage of the fed AC power and output the AC power, and a power conversion circuit 52 to convert the AC power fed from the transformer 51 into DC power. The power conversion apparatus 50 further includes the power conversion circuit 12 to convert the DC power fed from the power conversion circuit 52 into three-phase AC power for driving the motor 91 and feed the three-phase AC power to the motor 91, the filter capacitor 11 connected between the primary terminals of the power conversion circuit 12, and a discharging circuit 53 to discharge the filter capacitor 11. The power conversion circuit 12 is controlled by the control apparatus 25, as in Embodiment 1.

One end of the primary winding of the transformer 51 is connected to the positive-electrode terminal 1a, and the other end of the primary winding is connected to the negative-electrode terminal 1b. The secondary winding of the transformer 51 is connected to the power conversion circuit 52.

The power conversion circuit 52 includes serially connected first switching elements 54u, 55u, 54x, and 55x and serially connected first switching elements 54v, 55v, 54y, and 55y. The serially connected first switching elements 54u, 55u, 54x, and 55x are connected in parallel to the serially connected first switching elements 54v, 55v, 54y, and 55y. The connecting point between the first switching elements 54u and 55u and the connecting point between the first switching elements 54x and 55x are connected to the respective branches from one end of the secondary winding of the transformer 51. The connecting point between the first switching elements 54v and 55v and the connecting point between the first switching elements 54y and 55y are connected to the respective branches from the other end of the secondary winding of the transformer 51.

The first switching elements 54u, 55u, 54x, 55x, 54v, 55v, 54y, and 55y have the identical structure including the IGBT 14 and the freewheeling diode 15, as in Embodiments 1 and 2.

The control apparatus 25 controls the first switching elements 54u, 55u, 54x, 55x, 54v, 55v, 54y, and 55y by feeding first control signals Gu1, Gu2, Gx1, Gx2, Gv1, Gv2, Gy1, and Gy2 generated by the control apparatus 25 to the respective gate terminals of the IGBTs 14 of the first switching elements 54u, 55u, 54x, 55x, 54v, 55v, 54y, and 55y. Due to switching operations of the first switching elements 54u, 55u, 54x, 55x, 54v, 55v, 54y, and 55y, the power conversion circuit 52 converts single-phase AC power into DC power.

The discharging circuit 53 is connected in parallel to the filter capacitor 11 in the circuitry between the power conversion circuit 52 and the filter capacitor 11. The discharging circuit 53 includes a second switching element 56 and a resistor 57, which are serially connected.

In Embodiment 3, the second switching element 56 is a thyristor. The anode of the second switching element 56 is connected to the connecting point between the first switching elements 54u and 54v, and the cathode of the second switching element 56 is connected to one end of the resistor 57. The other end of the resistor 57 is connected to the connecting point between the first switching elements 55x and 55y.

The control apparatus 25 controls the second switching element 56 by feeding a second control signal G3 generated by the control apparatus 25 to the gate terminal of the second switching element 56. In response to turning on the second switching element 56, the filter capacitor 11 is discharged.

Figure 17:
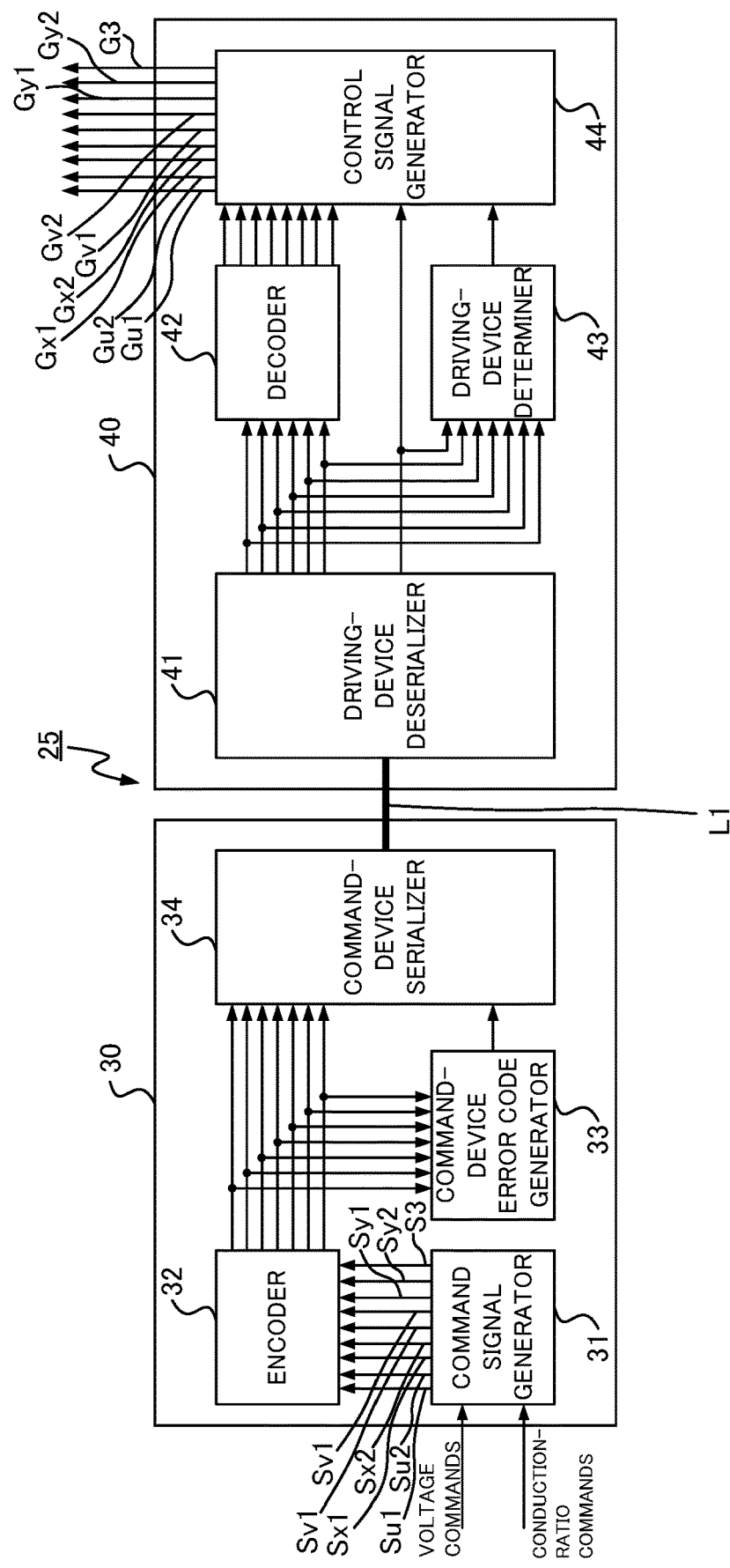
FIG. 17 is a block diagram illustrating a control apparatus according to Embodiment 3.

The following focuses on the control apparatus 25 for controlling the power conversion apparatus 50 having the above-described configuration. The control apparatus 25 has the same configuration as the control apparatus 23 of the power conversion system 1 according to Embodiment 1, except for that the data and signals generated by the control apparatus 25 differ from those generated by the control apparatus 23. In detail, as illustrated in FIG. 17, the control apparatus 25 includes the command device 30 to generate command data for instructing operations of the first switching elements 54u, 55u, 54x, 55x, 54v, 55v, 54y, and 55y and the second switching element 56, and the driving device 40 to generate first control signals Gu1, Gu2, Gx1, Gx2, Gv1, Gv2, Gy1, and Gy2 and a second control signal G3, in accordance with the command data generated by the command device 30.

The command device 30 and the driving device 40 have the same hardware configuration as that in Embodiment 1.

The following focuses on an operation of the control apparatus 25 having the above-described configuration.

The command device 30 of the control apparatus 25, when acquiring voltage commands from the voltage command generating circuit, initiates the command data transmitting process illustrated in FIG. 4, as in Embodiment 1. The command signal generator 31 acquires, from the voltage command generating circuit, voltage commands indicating a target value of the voltage output from the power conversion circuit 52 (Step S11).

The command signal generator 31 compares the triangular wave generated on the basis of a clock signal with the voltage commands acquired in Step S11, and thereby generates first command signals Su1, Su2, Sx1, Sx2, Sv1, Sv2, Sy1, and Sy2, which are PWM signals (Step S12). The first command signals Su1, Su2, Sx1, Sx2, Sv1, Sv2, Sy1, and Sy2 are binary signals. The first command signals Su1, Su2, Sx1, Sx2, Sv1, Sv2, Sy1, and Sy2 have a value of 1 indicating the on state, or a value of 0 indicating the off state, for example.

The command signal generator 31 acquires a conduction-ratio command indicating a target value of the conduction ratio of the second switching element 56, from the conduction-ratio command generating circuit (Step S13). The command signal generator 31 generates a second command signal S3, which is a PWM signal having on and off periods adjusted in accordance with the target value of the conduction ratio indicated by the conduction-ratio command (Step S14). The second command signal S3 is a binary signal. The second command signal S3 has a value of 1 indicating the on state, or a value of 0 indicating the off state, for example.

The command signal generator 31 executes parallel transmission of the first command signals Su1, Su2, Sx1, Sx2, Sv1, Sv2, Sy1, and Sy2 generated in Step S12 and the second command signal S3 generated in Step S14, to the encoder 32.

The encoder 32 encodes at least some signals of the first command signals Su1, Su2, Sx1, Sx2, Sv1, Sv2, Sy1, and Sy2 and the second command signal S3. In Embodiment 3, the encoder 32 encodes the first command signals Su1, Su2, Sx1, Sx2, Sv1, Sv2, Sy1, and Sy2, on the basis of the codes associated with possible combinations of values of the first command signals Su1, Su2, Sx1, Sx2, Sv1, Sv2, Sy1, and Sy2 (Step S15).

The first switching element 54u illustrated in FIG. 16 is never in the on state simultaneously with the first switching element 54x or the first switching element 55x. The first switching element 55u is never in the on state simultaneously with the first switching element 55x. The first switching element 54v is never in the on state simultaneously with the first switching element 54y or the first switching element 55y. The first switching element 55v is never in the on state simultaneously with the first switching element 55y.

The possible combinations of values of the first command signals Su1, Su2, Sx1, Sx2, Sv1, Sv2, Sy1, and Sy2 thus have 64 patterns. Accordingly, values of the first command signals Su1, Su2, Sx1, Sx2, Sv1, Sv2, Sy1, and Sy2 can be represented in a six-figure binary. The encoder 32 thus generates a 6-bit code of bits C0 to C5 corresponding to the values of the input first command signals Su1, Su2, Sx1, Sx2, Sv1, Sv2, Sy1, and Sy2, on the basis of the 6-bit codes associated with possible combinations of values of the first command signals Su1, Su2, Sx1, Sx2, Sv1, Sv2, Sy1, and $Sy^2$, as illustrated in FIG. 18.

As illustrated in FIG. 4, the encoder 32 generates encoded data containing the 6-bit data, generated by encoding the first command signals Su1, Su2, Sx1, Sx2, Sv1, Sv2, Sy1, and Sy2, and the second command signal S3 (Step S16). In detail, the encoder 32 generates 7-bit encoded data containing the 6-bit data of bits C0 to C5 and the data of bit C6 corresponding to the second command signal S3, as illustrated in FIG. 19. The encoder 32 then executes parallel transmission of the encoded data to the command-device error code generator 33 and the command-device serializer 34.

The command-device error code generator 33 and the command-device serializer 34 operate as in Embodiment 1. The command device 30 repeats the above-described steps, while voltage commands are being input from the voltage command generating circuit.

The driving device 40, when receiving the data frame from the command device 30, initiates the control signal generating process illustrated in FIG. 8. Steps S21 and S22 are identical to those in Embodiment 1.

The decoder 42 decodes the encoded data contained in the parallel command data (Step S23). In detail, the decoder 42 decodes subject data, specifically, the data of bits C0 to C5 corresponding to the first switching elements 54u, 55u, 54x, 55x, 54v, 55v, 54y, and 55y. The decoder 42 then generates decoded data containing the decoded data corresponding to the first switching elements 54u, 55u, 54x, 55x, 54v, 55v, 54y, and 55y and the data corresponding to the second switching element 56.

Step S24 is identical to that in Embodiment 1. When no error is determined to occur in the data during communication in Step S24 (Step S25; No), the control signal generator 44 generates first control signals Gu1, Gu2, Gx1, Gx2, Gv1, Gv2, Gy1, and Gy2 and a second control signal G3, on the basis of the parallel command data (Step S26). After completion of Step S26, the above-described steps from Step S21 are repeated.

The first control signals Gu1, Gu2, Gx1, Gx2, Gv1, Gv2, Gy1, and Gy2 and the second control signal G3 are voltage signals. The first control signals Gu1, Gu2, Gx1, Gx2, Gv1, Gv2, Gy1, and Gy2 and the second control signal G3 are fed to the respective gate terminals of the IGBTs 14 of the first switching elements 54u, 55u, 54x, 55x, 54v, 55v, 54y, and 55y and the second switching element 56, and thereby the first switching elements 54u, 55u, 54x, 55x, 54v, 55v, 54y, and 55y and the second switching element 56 are controlled. The control signal generator 44 varies the voltage values of the first control signals Gu1, Gu2, Gx1, Gx2, Gv1, Gv2, Gy1, and Gy2 and the second control signal G3, in accordance with values of the parallel command data.

When any error is determined to occur in the data during communication in Step S24 (Step S25; Yes), Step S26 is skipped, and the above-described steps from Step S21 are repeated. In this case, the control signal generator 44 keeps outputting the most recently generated first control signals Gu1, Gu2, Gx1, Gx2, Gv1, Gv2, Gy1, and Gy2 and second control signal G3.

In order to improve the safety of the control of the power conversion circuit 52, the decoder 42 preferably determines the existence of an abnormality in the parallel command data. In detail, as illustrated in FIG. 9, the decoder 42 preferably determines whether the parallel command data except for the command-device error code has any error (Step S27).

The decoder 42 preliminarily retains information on the codes associated with possible combinations of values of the first command signals Su1, Su2, Sx1, Sx2, Sv1, Sv2, Sy1, and Sy2 illustrated in FIG. 18. The decoder 42 then determines whether the encoded data contained in the parallel command data matches any of the associated codes. When the encoded data matches any of the associated codes, no error is deemed to occur in the parallel command data. When the decoder 42 determines that the encoded data matches any of the associated codes, that is, when the parallel command data has no error (Step S28; No), Step S23 and the following steps are executed.

In contrast, when the encoded data matches none of the associated codes, any error is deemed to occur in the parallel command data. When the decoder 42 determines that the encoded data matches none of the associated codes, that is, the parallel command data has any error (Step S28; Yes), the decoder 42 generates decoded data for instructing all the first switching elements 54u, 55u, 54x, 55x, 54v, 55v, 54y, and 55y and the second switching element 56 to be turned off.

The control signal generator 44 then generates first control signals Gu1, Gu2, Gx1, Gx2, Gv1, Gv2, Gy1, and Gy2 and a second control signal G3 for causing the first switching elements 54u, 55u, 54x, 55x, 54v, 55v, 54y, and 55y and the second switching element 56 to be turned off (Step S29). This step can prevent the power conversion circuit 12 from being controlled on the basis of abnormal data. After completion of Step S29, the above-described steps from Step S21 are repeated.

In the case where the decoder 42 is responsible for determination of the existence of an abnormality in the parallel command data, the decoder 42 preferably operates in accordance with the state transition diagram illustrated in FIG. 10, as in Embodiment 1.

As described above, the command device 30 and the driving device 40 of the control apparatus 25 according to Embodiment 3 are connected to each other with the single serial line L1. The command device 30 transmits serial command data for controlling the first switching elements 54u, 55u, 54x, 55x, 54v, 55v, 54y, and 55y and the second switching element 56 to the driving device 40 via the serial line L1, so that the driving device 40 is able to control the first switching elements 54u, 55u, 54x, 55x, 54v, 55v, 54y, and 55y and the second switching element 56.

The devices do not need multiple signal lines for the purpose of instructing the operations of the first switching elements 54u, 55u, 54x, 55x, 54v, 55v, 54y, and 55y and the second switching element 56, and therefore have simple structures for controlling the first switching elements 54u, 55u, 54x, 55x, 54v, 55v, 54y, and 55y and the second switching element 56.

The decoder 42 responsible for determination of the existence of an abnormality in the parallel command data can improve the safety of the control of the power conversion circuit 52.

Embodiment 4

The control apparatus may execute feedback control of the first switching elements 54u, 55u, 54x, 55x, 54v, 55v, 54y, and 55y and the second switching element 56. The description of Embodiment 4 is directed to a control apparatus 26 having a simple structure to control the first switching elements 54u, 55u, 54x, 55x, 54v, 55v, 54y, and 55y and the second switching element 56, on the basis of data indicating on/off states of the first switching elements 54u, 55u, 54x, 55x, 54v, 55v, 54y, and 55y and the second switching element 56.

Figure 20:
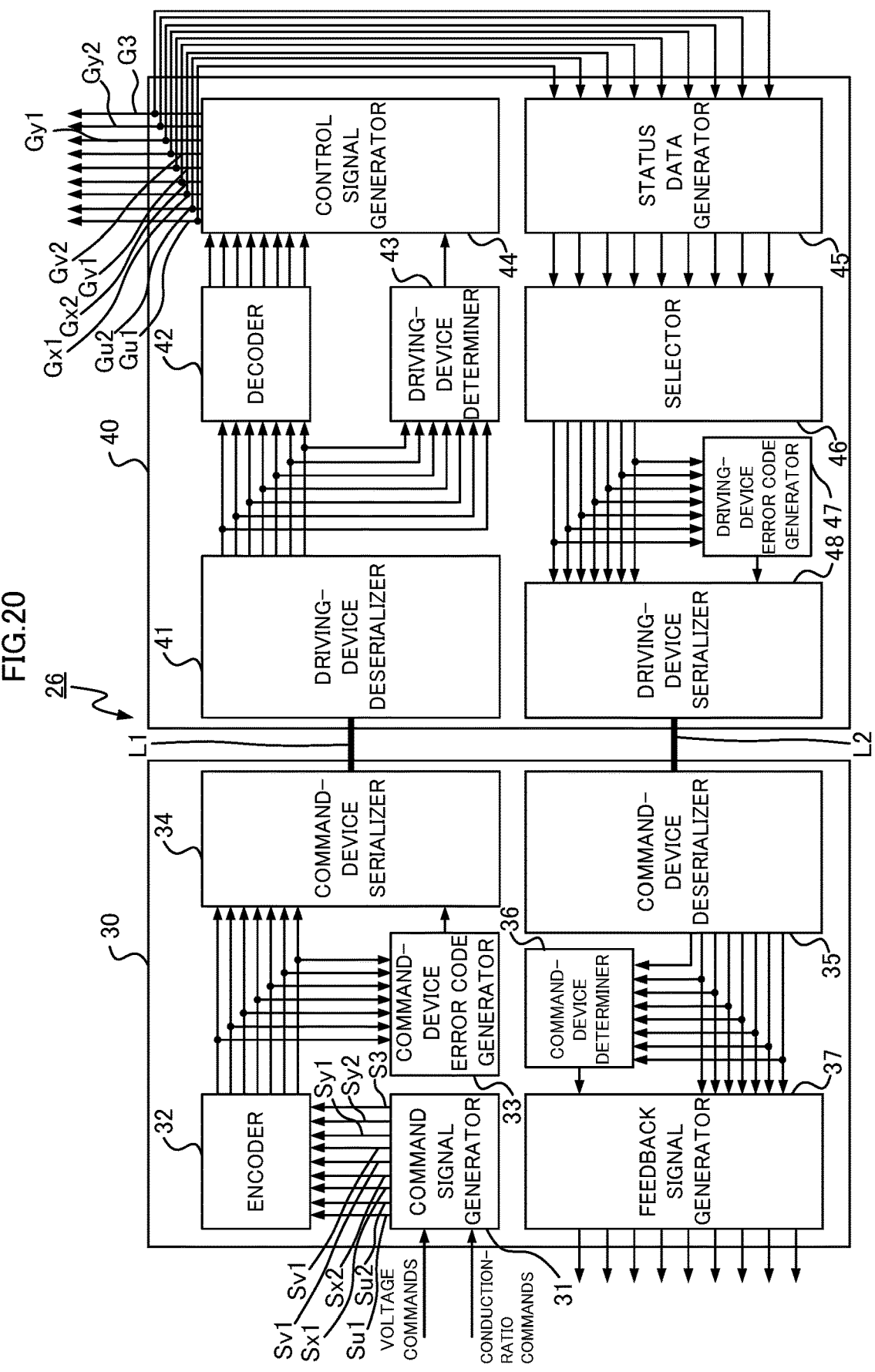
FIG. 20 is a block diagram illustrating a control apparatus according to Embodiment 4.

The control apparatus 26 illustrated in FIG. 20 controls the power conversion apparatus 50, which has the same configuration as that in Embodiment 3. The control apparatus 26 has the same configuration as the control apparatus 24 of the power conversion system 1 according to Embodiment 2, except for that the data and signals generated by the control apparatus 26 differ from those generated by the control apparatus 24. In detail, the control apparatus 26 includes the command device 30 to generate command data for instructing the operations of the first switching elements 54u, 55u, 54x, 55x, 54v, 55v, 54y, and 55y and the second switching element 56, and the driving device 40 to generate first control signals Gu1, Gu2, Gx1, Gx2, Gv1, Gv2, Gy1, and Gy2 and a second control signal G3 in accordance with the command data generated by the command device 30.

The driving device 40 generates status data indicating on/off states of the first switching elements 54u, 55u, 54x, 55x, 54v, 55v, 54y, and 55y and the second switching element 56, and transmits serial status data obtained through serial conversion of the status data, to the command device 30.

The command device 30 generates feedback signals indicating on/off states of the first switching elements 54u, 55u, 54x, 55x, 54v, 55v, 54y, and 55y and the second switching element 56, from the serial status data, and transmits the feedback signals to the voltage command generating circuit and the conduction-ratio command generating circuit. The voltage command generating circuit adjusts the voltage commands in accordance with the feedback signals. The conduction-ratio command generating circuit adjusts the conduction-ratio in accordance with the feedback signals. The control apparatus 26 can thus achieve feedback control of the first switching elements 54u, 55u, 54x, 55x, 54v, 55v, 54y, and 55y and the second switching element 56.

The driving device 40 and the command device 30 are connected to each other with the serial line L2, for the purpose of transmission and reception of serial status data.

The command device 30 and the driving device 40 have the same hardware configuration as that in Embodiment 1.

The following focuses on an operation of the control apparatus 26 having the above-described configuration.

The driving device 40 of the control apparatus 26, when receiving the data frame from the command device 30, initiates the feedback data transmitting process illustrated in FIG. 12, as in Embodiment 2. The status data generator 45 acquires the first control signals Gu1, Gu2, Gx1, Gx2, Gv1, Gv2, Gy1, and Gy2 and the second control signal G3 being fed to the gate terminals of the IGBTs 14 of the first switching elements 54u, 55u, 54x, 55x, 54v, 55v, 54y, and 55y and the second switching element 56 (Step S31). In detail, the status data generator 45 measures voltage values of the first control signals Gu1, Gu2, Gx1, Gx2, Gv1, Gv2, Gy1, and Gy2 and the second control signal G3.

The status data generator 45 then generates status data by converting the measured voltage values into digital data (Step S32). The status data generator 45 executes parallel transmission of the generated status data to the selector 46.

In Embodiment 4, the status data is 9-bit data. The selector 46 divides the status data and outputs the divided data (Step S33), because the driving-device serializer 48 is in conformity with the standard of conversion of 8-bit parallel data into serial data, like the command-device serializer 34. In detail, the selector 46 divides the status data into the data group indicating on/off states of the first switching elements 54$u$, 55$u$, 54$x$, and 55$x$ and the second switching element 56 and the data group indicating on/off states of the first switching elements 54$v$, 55$v$, 54$y$, and 55$y$, as illustrated in FIG. 21, adds codes for identifying the data groups to the divided data, and outputs the resulting data in parallel.

In the example illustrated in FIG. 21, the data of bit D6 contained in the data output from the selector 46 indicates an identification code for identifying the data group. In an exemplary case where the data of bit D6 is 0, the data output from the selector 46 corresponds to the data group indicating on/off states of the first switching elements 54$u$, 55$u$, 54$x$, and 55$x$ and the second switching element 56. In another exemplary case where the data of bit D6 is 1, the data output from the selector 46 corresponds to the data group indicating on/off states of the first switching elements 54$v$, 55$v$, 54$y$, and 55$y$.

Since the above-mentioned data groups indicating on/off states are 4-bit or 5-bit data, 0 is set to the unused bit D5. When the data of bit D6 is 0, the data of bit D4 indicates an on/off state of the second switching element 56. When the data of bit D6 is 1, 0 is set to the unused bit D4. The data of bit D3 indicates an on/off state of the first switching element 54$u$ or the first switching element 54$v$. The data of bit D2 indicates an on/off state of the first switching element 55$u$ or the first switching element 55$v$. The data of bit D1 indicates an on/off state of the first switching element 54$x$ or the first switching element 54$y$. The data of bit D0 indicates an on/off state of the first switching element 55$x$ or the first switching element 55$y$. The selector 46 generates 7-bit data of bits D0 to D6 as described above, and executes parallel transmission of the generated data to the driving-device serializer 48 and the driving-device error code generator 47.

Step S34 and the following steps in the driving device 40 are identical to those in Embodiment 2.

The command device 30, when receiving the data frame from the driving device 40, initiates the feedback signal generating process illustrated in FIG. 15, as in Embodiment 2. Steps S41 to S43 are identical to those in Embodiment 2.

When no error is determined to occur in the data during communication in Step S43 (Step S44; Yes), the feedback signal generator 37 generates feedback signals on the basis of the parallel status data (Step S45). After completion of Step S45, the above-described steps from Step S41 are repeated.

In detail, when the identification code contained in the parallel status data is 0, the feedback signal generator 37 generates feedback signals indicating on/off states of the first switching elements 54$u$, 55$u$, 54$x$, and 55$x$ and the second switching element 56, from the parallel status data. When the identification code contained in the parallel status data is 1, the feedback signal generator 37 generates feedback signals indicating on/off states of the first switching elements 54$v$, 55$v$, 54$y$, and 55$y$, from the parallel status data.

When any error is determined to occur in the data during communication in Step S43 (Step S44; Yes), Step S45 is skipped, and the above-described steps from Step S41 are repeated. In this case, the feedback signal generator 37 keeps outputting the most recently generated feedback signals.

As described above, the command device 30 and the driving device 40 of the control apparatus 26 according to Embodiment 4 are connected to each other with the serial line L2, for the purpose of transmission and reception of serial status data, which indicates on/off states of the first switching elements 54$u$, 55$u$, 54$x$, and 55$x$ and the second switching element 56. The devices do not need multiple signal lines for the purpose of transmission and reception of data indicating on/off states of the first switching elements 54$u$, 55$u$, 54$x$, and 55$x$ and the second switching element 56, and therefore have simple structures for feedback control of the first switching elements 54$u$, 55$u$, 54$x$, and 55$x$ and the second switching element 56.

Embodiment 5

The control apparatus may adjust the resistances of gate resistors as well as controlling the first switching elements 13$u$, 13$v$, 13$w$, 13$x$, 13$y$, and 13$z$. The description of Embodiment 5 is directed to the control apparatus 23 to adjust the resistances of gate resistors.

Figure 22:
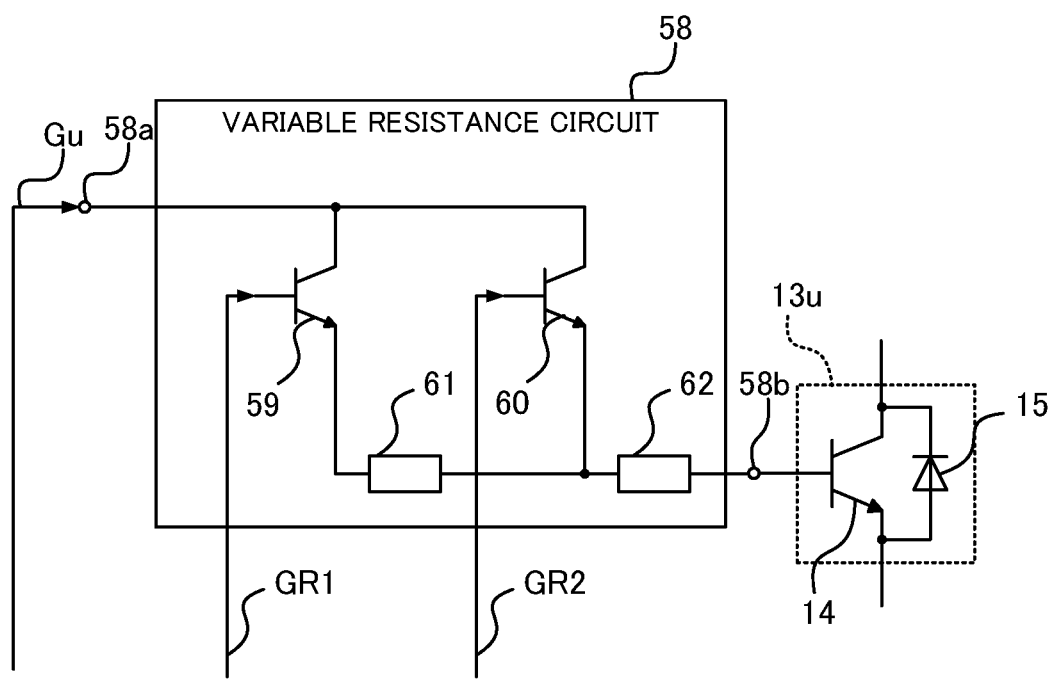
FIG. 22 illustrates an exemplary variable resistance circuit according to Embodiment 5.

The control apparatus 23 adjusts the gate resistances of the IGBTs 14 of the respective first switching elements 13$u$, 13$v$, 13$w$, 13$x$, 13$y$, and 13$z$. In order to adjust the gate resistances of the IGBTs 14, each of the gate terminals of the IGBTs 14 is connected to a variable resistance circuit 58 illustrated in FIG. 22. The resistance of the variable resistance circuit 58 is adjusted by means of third control signals GR1 and GR2 output from the control apparatus 23. Because the variable resistance circuits 58 connected to the respective gate terminals of the IGBTs 14 of the first switching elements 13$u$, 13$v$, 13$w$, 13$x$, 13$y$, and 13$z$ have the identical configuration, the following focuses on the variable resistance circuit 58 connected to the first switching element 13$u$.

The variable resistance circuit 58 has an input terminal 58$a$ to be fed with the first control signal Gu output from the control apparatus 23, and an output terminal 58$b$ connected to the gate terminal of the first switching element 13$u$. The variable resistance circuit 58 further includes third switching elements 59 and 60 having collector terminals connected to the input terminal 58$a$, a resistor 61 having one end connected to the emitter terminal of the third switching element 59 and the other end connected to the emitter terminal of the third switching element 60, and a resistor 62 having one end connected to the emitter terminal of the third switching element 60 and the other end connected to the output terminal 58$b$. The gate terminals of the third switching elements 59 and 60 are respectively fed with the third control signals GR1 and GR2 output from the control apparatus 23. The third control signals GR1 and GR2 switch the on/off states of the respective third switching elements 59 and 60, resulting in a change in the resistance of the variable resistance circuit 58.

The control apparatus 23 has the same configuration as that in Embodiment 1, except for that the control apparatus 23 acquires a resistance command for designating gate resistances from a resistance-adjusting command generating circuit, and feeds third control signals GR1 and GR2 to each of the first switching elements 13$u$, 13$v$, 13$w$, 13$x$, 13$y$, and 13$z$.

The following focuses on an operation of the control apparatus 23 for adjusting gate resistances.

When the resistance command indicates changes in the gate resistances, the command signal generator 31 of the command device 30 of the control apparatus 23 generates first command signals Su, Sv, Sw, Sx, Sy, and Sz assigned to changes in the gate resistances, regardless of the voltage commands.

In detail, in an exemplary case where the third switching element 59 is in the on state, the third switching element 60 is in the off state, and the resistance command indicates turning on the third switching elements 59 and 60, the command signal generator 31 generates first command signals Su, Sv, Sw, Sx, Sy, and Sz corresponding to the resistance command. The first command signals Su, Sv, Sw, Sx, Sy, and Sz corresponding to the resistance command are associated with an impossible combination of on/off states of the first switching elements 13u, 13v, 13w, 13x, 13y, and 13z, for example, the first command signals Su, Sv, Sw, Sx, Sy, and Sz all having a value of 1.

The encoder 32 retains information on the code associated with the first command signals Su, Sv, Sw, Sx, Sy, and Sz and corresponding to the resistance command, in addition to the codes illustrated in FIG. 5. The encoder 32 then generates 5-bit code associated with the first command signals Su, Sv, Sw, Sx, Sy, and Sz corresponding to the resistance command.

The command-device error code generator 33 and the command-device serializer 34 operate as in Embodiment 1.

The driving-device deserializer 41 of the driving device 40 of the control apparatus 23 operates as in Embodiment 1. The decoder 42 retains information on the code associated with the first command signals Su, Sv, Sw, Sx, Sy, and Sz corresponding to the resistance command, like the encoder 32. When the decoded data generated by the decoder 42 contains data assigned to changes in the gate resistances and associated with the impossible combination of on/off states of the first switching elements 13u, 13v, 13w, 13x, 13y, and 13z, the control signal generator 44 generates first control signals Gu, Gv, Gw, Gx, Gy, and Gz for causing all the first switching elements 13u, 13v, 13w, 13x, 13y, and 13z to be turned off. The control signal generator 44 then generates third control signals GR1 and GR2 on the basis of the data assigned to changes in the gate resistances. This process turns off the first switching elements 13u, 13v, 13w, 13x, 13y, and 13z. The third switching elements 59 and 60 of the variable resistance circuits 58 connected to the gate terminals of the IGBTs 14 of the respective first switching elements 13u, 13v, 13w, 13x, 13y, and 13z are then controlled, leading to adjustment of the gate resistances.

Figure 23:
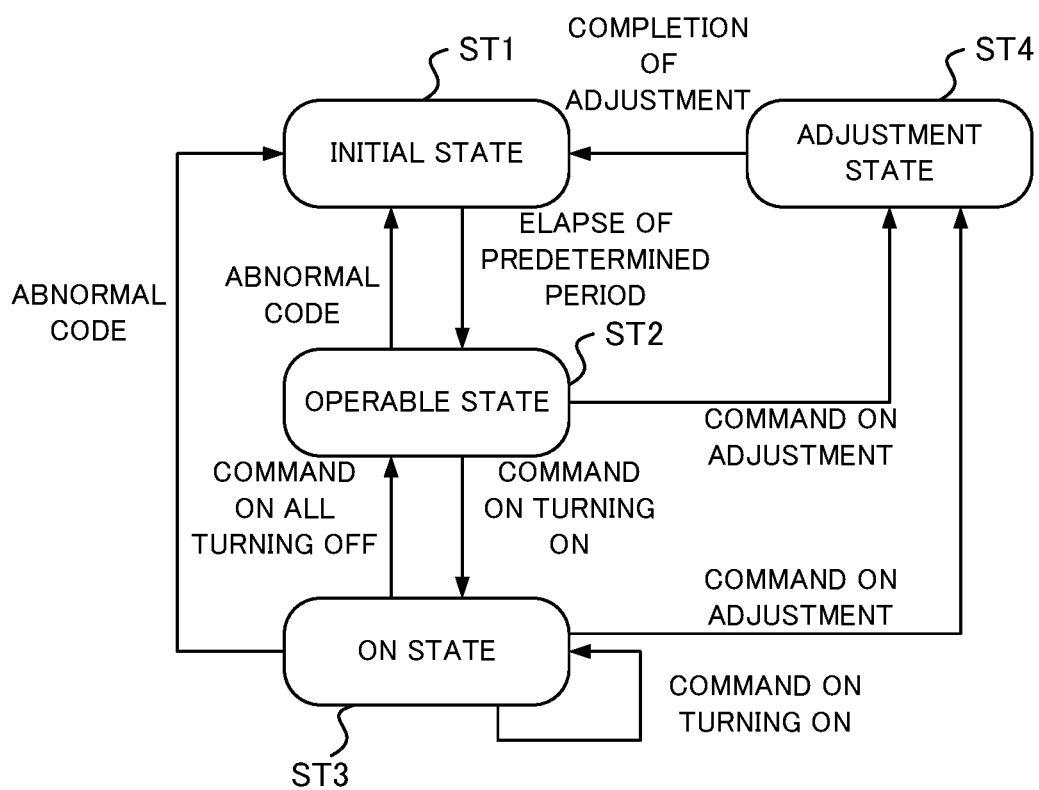
FIG. 23 is a state transition diagram of a decoder of a driving device according to Embodiment 5.

The decoder 42 operates in accordance with the state transition diagram illustrated in FIG. 23. The initial state ST1, the operable state ST2, and the on state ST3 are the same as those in FIG. 10. In the operable state ST2 or the on state ST3, when the decoded data contains the data assigned to changes in the gate resistances, the decoder 42 transits to the adjustment state ST4.

In the adjustment state ST4, the decoder 42 generates first control signals Gu, Gv, Gw, Gx, Gy, and Gz for causing all the first switching elements 13u, 13v, 13w, 13x, 13y, and 13z to be turned off, and generates third control signals GR1 and GR2 associated with the data assigned to changes in the gate resistances contained in the decoded data. The decoder 42 then transits to the initial state ST1.

As described above, the control apparatus 23 according to Embodiment 5 can, not only control the first switching elements 13u, 13v, 13w, 13x, 13y, and 13z, but also adjust the resistances of the gate resistors for the IGBTs 14 of the respective first switching elements 13u, 13v, 13w, 13x, 13y, and 13z.

High resistances of the gate resistors can suppress surge voltages caused by switching operations of the first switching elements 13u, 13v, 13w, 13x, 13y, and 13z. In contrast, low resistances of the gate resistors can reduce switching losses in the first switching elements 13u, 13v, 13w, 13x, 13y, and 13z.

The above-described embodiments are not intended to limit the scope of the present disclosure. The above-described hardware configurations and flowcharts are mere examples and may be arbitrarily modified and corrected.

Figure 24:
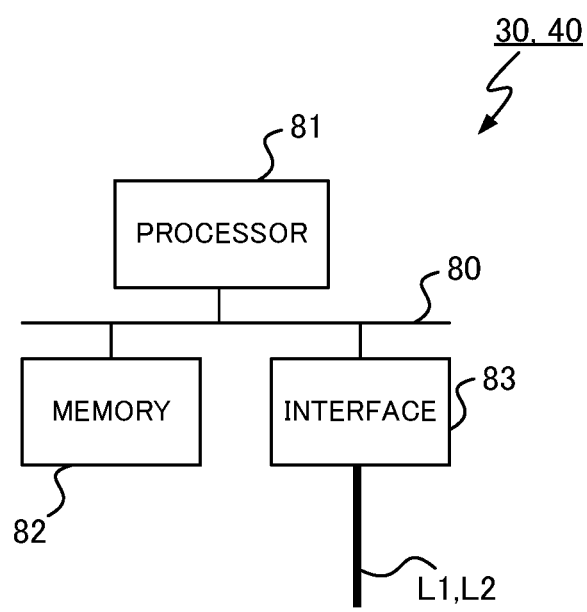
FIG. 24 is a block diagram illustrating a modified hardware configuration of a command device and a driving device according to the embodiments.

The functions of the command device 30 and the driving device 40 may be performed by software. In this case, as illustrated in FIG. 24, the command device 30 and the driving device 40 each include a processor 81, a memory 82, and an interface 83. The processor 81, the memory 82, and the interface 83 are connected to each other with buses 80.

The functions of the command device 30 and the driving device 40 are performed by software, firmware, or a combination of software and firmware. The software and the firmware are described in the form of programs and stored in the memory 82. The processor 81 reads and executes the programs stored in the memory 82, and thereby achieves the above-described functions of the components. That is, the memory 82 stores programs for executing operations of the command device 30 and the driving device 40.

Examples of the memory 82 include non-volatile or volatile semiconductor memories, such as random access memory (RAM), read only memory (ROM), flash memory, erasable programmable read only memory (EPROM), and electrically erasable and programmable read only memory (EEPROM), magnetic disks, flexible disks, optical disks, compact discs, mini discs, and digital versatile discs (DVDs).

A part of the functions of the command device 30 and the driving device 40 may be performed by dedicated hardware, while another part of the functions may be performed by software or firmware. For example, the command signal generator 31 and the command-device serializer 34 may be achieved by the processing circuit 71 illustrated in FIG. 3, while the encoder 32 and the command-device error code generator 33 may be achieved by programs stored in the memory 82 when the programs are read and executed by the processor 81 illustrated in FIG. 24.

The above-described configurations of the power conversion apparatuses 10 and 50 are mere examples. The power conversion apparatuses 10 and 50 may include a direct-current-direct-current (DC-DC) converter, for example. In this case, the control apparatuses 23, 24, 25, and 26 control first switching elements included in the DC-DC converter and the second switching element 56 included in the discharging circuit 53.

In the case where possible combinations of values of first switching elements and one or more second switching elements are determined in advance, the encoder 32 may collectively encode values of the first switching elements and the one or more second switching elements.

The first switching elements 13u, 13v, 13w, 13x, 13y, 13z, 54u, 55u, 54x, 55x, 54v, 55v, 54y, and 55y and the second switching elements 17 and 19 may be any element capable of switching operations, other than IGBTs. For example, the first switching elements 13u, 13v, 13w, 13x, 13y, 13z, 54u, 55u, 54x, 55x, 54v, 55v, 54y, and 55y and the second switching elements 17 and 19 may be metal-oxide semiconductor field-effect transistors (MOSFETs).

The second switching element 56 is not necessarily a thyristor and may also be an IGBT or a MOSFET, for example.

The discharging circuit 53 may have any circuit configuration other than the above-described configuration provided that the discharging circuit 53 can discharge the filter capacitor 11.

The variable resistance circuit 58 may have any circuit configuration other than the above-described configuration provided that the resistance of the variable resistance circuit 58 is variable.

In the case where the control apparatus 24 adjusts the resistances of the gate resistors as well as controlling the first switching elements 13u, 13v, 13w, 13x, 13y, and 13z, like the control apparatus 23 in Embodiment 5, the driving device 40 of the control apparatus 24 may transmit data indicating on/off states of the third switching elements 59 and 60 to the command device 30. For example, the selector 46 may assign the data indicating on/off states of the third switching elements 59 and 60 to the bit D4 and then output the resulting data.

The driving device 40 according to Embodiment 2 may transmit, to the command device 30, not only the data indicating on/off states of the first switching elements 13u, 13v, 13w, 13x, 13y, and 13z and the second switching elements 17 and 19, but also data indicating the state of the driving device 40, for example, data indicating the existence of a decrease in the power supply voltage of the driving device 40, for example. In detail, the driving device 40 may determine the existence of a decrease in the power supply voltage on the basis of a value measured by a sensor for measuring a power supply voltage, and transmit a result of determination to the command device 30. In this case, the selector 46 assigns the data indicating the existence of a decrease in the power supply voltage to the bit D5 and outputs the resulting data.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to betaken in a limiting sense, and the scope of the invention is defined only by the included claims, along with the full range of equivalents to which such claims are entitled.

REFERENCE SIGNS LIST 1, 2 Power conversion system
1a Positive-electrode terminal
1b Negative-electrode terminal
10, 50 Power conversion apparatus
11 Filter capacitor
12, 52 Power conversion circuit
12a, 12b Primary terminal
12c, 12d, 12e Secondary terminal
13u, 13v, 13w, 13x, 13y, 13z, 54u, 55u, 54x, 55x, 54v, 55v, 54y, 55y First switching element
14 IGBT
15, 21, 22 Freewheeling diode
16 Power consumption circuit
17, 19, 56 Second switching element
18, 20, 57, 61, 62 Resistor
23, 24, 25, 26 Control apparatus
30 Command device
31 Command signal generator
32 Encoder
33 Command-device error code generator
34 Command-device serializer
35 Command-device deserializer
36 Command-device determiner
37 Feedback signal generator
40 Driving device
41 Driving-device deserializer
42 Decoder
43 Driving-device determiner
44 Control signal generator
45 Status data generator
46 Selector
47 Driving-device error code generator
48 Driving-device serializer
51 Transformer
53 Discharging circuit
58 Variable resistance circuit
58a Input terminal
58b Output terminal
59, 60 Third switching element
71 Processing circuit
72 Interface circuit
80 Bus
81 Processor
82 Memory
83 Interface
91 Motor
Gu, Gv, Gw, Gx, Gy, Gz, Gu1, Gu2, Gx1, Gx2, Gv1, Gv2, Gy1, Gy2 First control signal
G1, G2, G3 Second control signal
GR1, GR2 Third control signal
L1, L2 Serial line
Su, Sv, Sw, Sx, Sy, Sz, Su1, Su2, Sx1, Sx2, Sv1, Sv2, Sy1, Sy2 First command signal
S1, S2, S3 Second command signal

The invention claimed is:

1. A command device connectable to a driving device via a serial line, the driving device being configured to control operations of a plurality of first switching elements included in a power conversion circuit of a power conversion apparatus and one or more second switching elements included in the power conversion apparatus and independent from the power conversion circuit, the command device comprising:

command signal generating circuitry to generate a plurality of first command signals and one or more second command signals, the plurality of first command signals being binary signals for instructing operations of the plurality of first switching elements, the one or more second command signals being binary signals for instructing operations of the one or more second switching elements;

an encoder to encode at least some signals of the plurality of first command signals and the one or more second command signals in accordance with possible combinations of values of at least some signals of the plurality of first command signals and the one or more second command signals, and thereby generate encoded data for instructing the operations of the plurality of first switching elements and the one or more second switching elements, the encoded data being represented in a smaller number of bits than a sum of a number of the plurality of first switching elements and a number of the one or more second switching elements; and a command-device serializer to generate serial command data through serial conversion of the encoded data, and transmit the serial command data to the driving device via the serial line, wherein the command signal generating circuitry
generates eight first command signals of the plurality of first command signals for instructing operations of eight first switching elements of the plurality of first switching elements included in the power conversion circuit, the power conversion circuit being a converter configured to convert AC power received at primary terminals into DC power and to output the DC power from secondary terminals, and generates a single second command signal of the one or more second command signals for instructing an operation of a single second switching element of the one or more second switching elements included in a discharging circuit, the discharging circuit being connected between the secondary terminals of the converter, and the encoder generates 6-bit data by encoding the eight first command signals, and generates 7-bit encoded data containing the 6-bit data and a value of the single second command signal.

2. The command device according to claim 1, wherein the encoder generates the encoded data, the encoded data containing values of the one or more second command signals and data represented in a smaller number of bits than the number of the plurality of first switching elements, the data being generated by encoding the plurality of first command signals in accordance with codes associated with possible combinations of values of the plurality of first command signals.

3. The command device according to claim 2, further comprising:

command-device error code generating circuitry to generate a command-device error code from the encoded data, wherein the command-device serializer generates the serial command data through serial conversion of the encoded data provided with the command-device error code.

4. The command device according to claim 2, further comprising:

a command-device deserializer to acquire, from the driving device, serial status data indicating whether the plurality of first switching elements and the one or more second switching elements are in on or off states, and to generate parallel status data through parallel conversion of the serial status data; and feedback signal generating circuitry to generate, from the parallel status data, a plurality of feedback signals indicating whether the plurality of first switching elements and the one or more second switching elements are in on or off states, and to output the plurality of feedback signals.

5. The command device according to claim 1, further comprising:

command-device error code generating circuitry to generate a command-device error code from the encoded data, wherein the command-device serializer generates the serial command data through serial conversion of the encoded data provided with the command-device error code.

6. The command device according to claim 1, further comprising:

a command-device deserializer to acquire, from the driving device, serial status data indicating whether the plurality of first switching elements and the one or more second switching elements are in on or off states, and to generate parallel status data through parallel conversion of the serial status data; and feedback signal generating circuitry to generate, from the parallel status data, a plurality of feedback signals indicating whether the plurality of first switching elements and the one or more second switching elements are in on or off states, and to output the plurality of feedback signals.

7. The command device according to claim 6, further comprising:

command-device determining circuitry to determine, based on a driving-device error code contained in the parallel status data, whether the parallel status data has any error, wherein when the command-device determining circuitry determines that the parallel status data has no error, the feedback signal generating circuitry generates the plurality of feedback signals.

8. A control apparatus comprising:

the command device according to claim 1; and a driving device to control operations of a plurality of first switching elements included in a power conversion circuit of a power conversion apparatus and one or more second switching elements included in the power conversion apparatus and independent from the power conversion circuit, wherein the driving device comprises a driving-device deserializer to acquire, from a command device, serial command data for instructing the operations of the plurality of first switching elements and the one or more second switching elements, and to generate parallel command data through parallel conversion of the serial command data, the command device being connected to the driving device via a serial line, a decoder to decode encoded data contained in the parallel command data, and thereby generate decoded data for instructing the operations of the plurality of first switching elements and the one or more second switching elements, control signal generating circuitry to generate, based on the decoded data, a plurality of first control signals directed to the plurality of first switching elements and one or more second control signals directed to the one or more second switching elements, transmit the plurality of first control signals to the plurality of first switching elements, and transmit the one or more second control signals to the one or more second switching elements, status data generating circuitry to generate status data indicating whether the plurality of first switching elements and the one or more second switching elements are in on or off states, and a driving-device serializer to generate serial status data through serial conversion of the status data, and transmit the serial status data to the command device via a serial line.

9. A power conversion system comprising:

a power conversion apparatus including a power conversion circuit including a plurality of first switching elements, and one or more second switching elements independent from the power conversion circuit, the power conversion apparatus being configured to convert input electric power into electric power for being fed to a load and to feed the electric power resulting from conversion to the load; and the control apparatus according to claim 8 to control operations of the plurality of first switching elements and the one or more second switching elements.

10. A command device connectable to a driving device via a serial line, the driving device being configured to control operations of a plurality of first switching elements included in a power conversion circuit of a power conversion apparatus and one or more second switching elements included in the power conversion apparatus and independent from the power conversion circuit, the command device comprising:

command signal generating circuitry to generate a plurality of first command signals and one or more second command signals, the plurality of first command signals being binary signals for instructing operations of the plurality of first switching elements, the one or more second command signals being binary signals for instructing operations of the one or more second switching elements;

an encoder to encode at least some signals of the plurality of first command signals and the one or more second command signals in accordance with possible combinations of values of at least some signals of the plurality of first command signals and the one or more second command signals, and thereby generate encoded data for instructing the operations of the plurality of first switching elements and the one or more second switching elements, the encoded data being represented in a smaller number of bits than a sum of a number of the plurality of first switching elements and a number of the one or more second switching elements;

a command-device serializer to generate serial command data through serial conversion of the encoded data, and transmit the serial command data to the driving device via the serial line;

a command-device deserializer to acquire, from the driving device, serial status data indicating whether the plurality of first switching elements and the one or more second switching elements are in on or off states, and to generate parallel status data through parallel conversion of the serial status data; and feedback signal generating circuitry to generate, from the parallel status data, a plurality of feedback signals indicating whether the plurality of first switching elements and the one or more second switching elements are in on or off states, and to output the plurality of feedback signals.

11. The command device according to claim 10, further comprising:

command-device determining circuitry to determine, based on a driving-device error code contained in the parallel status data, whether the parallel status data has any error, wherein when the command-device determining circuitry determines that the parallel status data has no error, the feedback signal generating circuitry generates the plurality of feedback signals.

12. A control apparatus comprising:

the command device according to claim 10; and a driving device to control operations of a plurality of first switching elements included in a power conversion circuit of a power conversion apparatus and one or more second switching elements included in the power conversion apparatus and independent from the power conversion circuit, wherein the driving device comprises a driving-device deserializer to acquire, from a command device, serial command data for instructing the operations of the plurality of first switching elements and the one or more second switching elements, and to generate parallel command data through parallel conversion of the serial command data, the command device being connected to the driving device via a serial line, a decoder to decode encoded data contained in the parallel command data, and thereby generate decoded data for instructing the operations of the plurality of first switching elements and the one or more second switching elements, control signal generating circuitry to generate, based on the decoded data, a plurality of first control signals directed to the plurality of first switching elements and one or more second control signals directed to the one or more second switching elements, transmit the plurality of first control signals to the plurality of first switching elements, and transmit the one or more second control signals to the one or more second switching elements, status data generating circuitry to generate status data indicating whether the plurality of first switching elements and the one or more second switching elements are in on or off states, and a driving-device serializer to generate serial status data through serial conversion of the status data, and transmit the serial status data to the command device via a serial line.

13. A driving device to control operations of a plurality of first switching elements included in a power conversion circuit of a power conversion apparatus and one or more second switching elements included in the power conversion apparatus and independent from the power conversion circuit, the driving device comprising:

a driving-device deserializer to acquire, from a command device, serial command data for instructing the operations of the plurality of first switching elements and the one or more second switching elements, and to generate parallel command data through parallel conversion of the serial command data, the command device being connected to the driving device via a serial line;

a decoder to decode encoded data contained in the parallel command data, and thereby generate decoded data for instructing the operations of the plurality of first switching elements and the one or more second switching elements;

control signal generating circuitry to generate, based on the decoded data, a plurality of first control signals directed to the plurality of first switching elements and one or more second control signals directed to the one or more second switching elements, transmit the plurality of first control signals to the plurality of first switching elements, and transmit the one or more second control signals to the one or more second switching elements;

status data generating circuitry to generate status data indicating whether the plurality of first switching elements and the one or more second switching elements are in on or off states; and a driving-device serializer to generate serial status data through serial conversion of the status data, and transmit the serial status data to the command device via a serial line.

14. The driving device according to claim 13, wherein when the encoded data contained in the parallel command data is not a code associated with a possible combination of on or off states of at least some elements of the plurality of first switching elements and the one or more second switching elements, the decoder generates the decoded data for instructing the plurality of first switching elements and the one or more second switching elements to be turned off.

15. The driving device according to claim 14, further comprising:

driving-device determining circuitry to determine, based on a command-device error code contained in the parallel command data, whether the parallel command data has any error, wherein when the driving-device determining circuitry determines that the parallel command data has no error, the control signal generating circuitry generates the plurality of first control signals and the one or more second control signals.

16. The driving device according to claim 13, further comprising:

driving-device determining circuitry to determine, based on a command-device error code contained in the parallel command data, whether the parallel command data has any error, wherein when the driving-device determining circuitry determines that the parallel command data has no error, the control signal generating circuitry generates the plurality of first control signals and the one or more second control signals.

17. The driving device according to claim 13, wherein the control signal generating circuitry generates, in accordance with the parallel command data, a plurality of third control signals for adjusting resistances of a plurality of variable resistance circuits connected to the plurality of respective first switching elements, and transmits the plurality of third control signals to the plurality of variable resistance circuits.

18. The driving device according to claim 13, further comprising:

driving-device error code generating circuitry to generate a driving-device error code from the status data, wherein the driving-device serializer generates the serial status data through serial conversion of the status data provided with the driving-device error code.

* * * * *